(12) United States Patent
Xie et al.

(10) Patent No.: US 12,556,999 B2
(45) Date of Patent: Feb. 17, 2026

(54) CELL SELECTION METHOD AND APPARATUS

(71) Applicant: HUAWEI TECHNOLOGIES CO., LTD., Guangdong (CN)

(72) Inventors: Zonghui Xie, Shenzhen (CN); Lei Chen, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 18/340,851

(22) Filed: Jun. 24, 2023

(65) Prior Publication Data

US 2023/0337102 A1 Oct. 19, 2023

Related U.S. Application Data

(63) Continuation of application No. PCT/CN2021/070704, filed on Jan. 7, 2021.

(51) Int. Cl.
*H04W 36/36* (2009.01)
*H04W 36/30* (2009.01)
*H04W 48/18* (2009.01)

(52) U.S. Cl.
CPC ......... *H04W 36/36* (2013.01); *H04W 36/302* (2023.05); *H04W 48/18* (2013.01)

(58) Field of Classification Search
None
See application file for complete search history.

(56) References Cited

U.S. PATENT DOCUMENTS

2018/0234983 A1 8/2018 Matsumoto et al.
2020/0280913 A1* 9/2020 Chen ................... H04W 48/12
(Continued)

FOREIGN PATENT DOCUMENTS

| CN | 109803332 A | 5/2019 |
|---|---|---|
| CN | 111149391 A | 5/2020 |

(Continued)

OTHER PUBLICATIONS

3GPP TS 38.331 V16.3.0:"3rd Generation Partnership Project; Technical Specification Group Radio Access Network; NR; Radio Resource Control (RRC) protocol specification (Release 16)".Dec. 2020,total 932 pages.
(Continued)

*Primary Examiner* — Robert J Hance

(57) ABSTRACT

This application provides a cell selection method and apparatus, to resolve abnormal wireless communication between a terminal device and a selected cell. The method includes: A terminal device may obtain a first offset of at least one first to-be-selected cell. The first offset is used to determine a cell selection parameter of the at least one first to-be-selected cell. The cell selection parameter includes a cell selection receive level value Srxlev and/or a cell selection receive quality value Squal. Next, the terminal device may determine, based on uplink capability as to whether the terminal device can perform uplink enhancement, the cell selection parameter of the at least one first to-be-selected cell by using the first offset. Then, the terminal device may determine a first cell from the at least one first to-be-selected cell based on the cell selection parameter.

14 Claims, 9 Drawing Sheets

(56) References Cited

U.S. PATENT DOCUMENTS

| | | | |
|---|---|---|---|
| 2021/0045054 A1* | 2/2021 | Liu | H04L 5/0048 |
| 2021/0345343 A1* | 11/2021 | Taherzadeh Boroujeni | |
| | | | H04W 72/54 |
| 2023/0284131 A1* | 9/2023 | Höglund | H04W 48/12 |
| | | | 370/329 |

FOREIGN PATENT DOCUMENTS

| | | | | |
|---|---|---|---|---|
| CN | 111357327 A | 6/2020 | | |
| EP | 3295718 A1 | 3/2018 | | |
| WO | 2016183025 A1 | 11/2016 | | |
| WO | WO-2021231816 A1 * | 11/2021 | ........... | H04L 5/0053 |
| WO | WO-2022031221 A1 * | 2/2022 | ............ | H04W 72/23 |

OTHER PUBLICATIONS

3GPP TS 38.101-1 V15.11.0:"3rd Generation Partnership Project; Technical Specification Group Radio Access Network; NR; User Equipment (UE) radio transmission and reception; Part 1: Range 1 Standalone (Release 15)",Sep. 2020,total 239 pages.

3GPP TS 23.122 V17.1.1:"3rd Generation Partnership Project; Technical Specification Group Core Network and Terminals; Non-Access-Stratum (NAS) functions related to Mobile Station (MS) in idle mode (Release 17)",Jan. 2021,total 88 pages.

* cited by examiner

CELL SELECTION METHOD AND APPARATUS

CROSS-REFERENCE TO RELATED APPLICATIONS

This application is a continuation of International Application No. PCT/CN2021/070704, filed on Jan. 7, 2021, the disclosure of which is hereby incorporated by reference in its entirety.

TECHNICAL FIELD

This application relates to the communication field, and in particular, to a cell selection method and apparatus.

BACKGROUND

In a cellular communication system, when being powered on, a terminal device (for example, user equipment (User Equipment, UE)) may select, from at least one cell according to a cell selection criterion (which may also be referred to as a criterion S), a cell on which the terminal device can camp. Then, the terminal may perform wireless communication with the selected cell.

However, different terminal devices have different uplink transmit powers. For example, some reduced capability terminal devices (reduced capability UE, REDCAP UE) are introduced into an existing communication system. An uplink transmit power of such terminal device is low, and may be lower than that of another terminal device in an existing network. As a result, although such terminal device determines that the terminal device is within a downlink coverage area indicated by the cell selection criterion, such terminal may fail to perform wireless communication with the cell due to an insufficient uplink transmit power.

Currently, the uplink transmit power of the reduced capability terminal may be increased by using some uplink enhancement technologies (which may also be referred to as coverage recovery technologies), so that the terminal can perform wireless communication with the cell within a coverage area of the cell. However, an uplink enhancement capability (which may also be referred to as a coverage recovery capability) is an optional capability of the terminal and a network device. In other words, the terminal and the network device may support uplink enhancement, or may not support uplink enhancement. The uplink transmit power of the terminal can be increased through uplink enhancement only when both the terminal and the network device support uplink enhancement. When the terminal or the network device does not support uplink enhancement, the uplink transmit power of the terminal still cannot be increased.

Therefore, during cell selection, if both a terminal that can perform uplink enhancement and a terminal that cannot perform uplink enhancement select a cell according to a same selection criterion, some terminals may fail to perform wireless communication with the selected cell.

SUMMARY

Embodiments of this application provide a cell selection method and apparatus, to resolve abnormal wireless communication between a terminal and a selected cell.

To achieve the foregoing objective, the following technical solutions are used in this application.

According to a first aspect, a cell selection method is provided. The cell selection method includes: A terminal device obtains a first offset of at least one first to-be-selected cell. The first offset is used to determine a cell selection parameter of the at least one first to-be-selected cell. The cell selection parameter includes a cell selection receive level value Srxlev and/or a cell selection receive quality value Squal. Then, the terminal device may determine, based on uplink capability information (indicating whether the terminal device can perform uplink enhancement) of the terminal device, the cell selection parameter of the at least one first to-be-selected cell by using the first offset. Then, the terminal device may determine a first cell based on the cell selection parameter.

According to the foregoing technical solution, when determining the cell selection parameter (Srxlev and/or Squal) by using the first offset, the terminal device combines the uplink capability information of the terminal device. The uplink capability information of the terminal device may indicate whether the terminal device can perform uplink enhancement. In this way, in this solution, for a terminal device that can perform uplink enhancement, a cell selection parameter of the terminal device may be different from a cell selection parameter of a terminal device that cannot perform uplink enhancement. Therefore, in this solution, for the two types of terminal devices, different cell selection parameters may be used to perform cell selection, to ensure normal communication between the terminal device and a selected cell.

With reference to the first aspect, in a possible design manner, the first offset may include a first-type offset and/or a second-type offset. The first-type offset is used to determine Srxlev, and the second-type offset is used to determine Squal. In other words, the first offset may be used to determine Srxlev and/or Squal.

With reference to the first aspect, in another possible design manner, the first offset may include a first-type offset. The first-type offset may include a first offset parameter and a second offset parameter. Both the first offset parameter and the second offset parameter are used to determine Srxlev. The first offset parameter is greater than the second offset parameter.

For any first to-be-selected cell in the at least one first to-be-selected cell, the terminal device may determine Srxlev of the first to-be-selected cell by performing the following step.

If the uplink capability information of the terminal device indicates that the terminal device can perform uplink enhancement, the terminal device determines Srxlev of the first to-be-selected cell by using the first offset parameter in the first-type offset. If the uplink capability information indicates that the terminal device cannot perform uplink enhancement, the terminal device determines Srxlev of the first to-be-selected cell by using the second offset parameter in the first-type offset.

That the terminal device can perform uplink enhancement includes: The terminal device supports uplink enhancement, and the first to-be-selected cell supports uplink enhancement. That the terminal device cannot perform uplink enhancement includes: The terminal device does not support uplink enhancement, or the first to-be-selected cell does not support uplink enhancement.

It should be understood that a cell selection criterion for performing cell selection by the terminal device includes Srxlev>0. Both the first offset parameter and the second offset parameter are used to determine Srxlev. A specific manner of determining Srxlev by using the first offset parameter may be Srxlev=A+N1. A specific manner of determining Srxlev by using the second offset parameter may be Srxlev=A+N2. A is used to represent impact of another factor (for example, a reference signal received power obtained through measurement) on Srxlev. N1 is the first offset parameter. N2 is the second offset parameter.

Because the first offset parameter N1 is greater than the second offset parameter N2, A+N1>0 is more likely than A+N2>0. In other words, A+N2>0 is less likely than A+N1>0. Compared with a manner of determining Srxlev by using the first offset parameter N1, in a manner of determining Srxlev by using the second offset parameter N2 to perform cell selection, a higher value of A is required.

A key factor that affects the value of A is a distance between the terminal device and a network device. The closer the distance; the larger the value of A. The farther the distance; the smaller the value of A. According to this solution, if the terminal device cannot perform uplink enhancement, the terminal device determines Srxlev by using the second offset parameter. In this case, if the terminal device needs to access a cell, it indicates that a larger value of A is required. In this case, the terminal device needs to be closer to the network device. In this way, even if the terminal device cannot perform uplink enhancement, because the terminal device is close to the network device and a signal is good, normal communication between the terminal device and the network device can still be ensured.

With reference to the first aspect, in another possible design manner, the first offset parameter is equal to 0, and the second offset parameter is less than 0. Alternatively, the first offset parameter is greater than 0, and the second offset parameter is less than or equal to 0. It should be noted that Srxlev is not changed when the first offset parameter or the second offset parameter is equal to 0.

With reference to the first aspect, in another possible design manner, the first offset includes the second-type offset, and the second-type offset is used to determine Squal.

With reference to the first aspect, in another possible design manner, the first offset may include a second-type offset. The second-type offset may include a third offset parameter and a fourth offset parameter. Both the third offset parameter and the fourth offset parameter are used to determine Squal. The third offset parameter is greater than the fourth offset parameter.

For any first to-be-selected cell in the at least one first to-be-selected cell, the terminal device may determine Squal of the first to-be-selected cell by performing the following step.

If the uplink capability information of the terminal device indicates that the terminal device can perform uplink enhancement, the terminal device may determine Squal of the first to-be-selected cell by using the third offset parameter in the second-type offset. If the uplink capability information of the terminal device indicates that the terminal device cannot perform uplink enhancement, the terminal device may determine Squal of the first to-be-selected cell by using the fourth offset parameter in the second-type offset.

That the terminal device can perform uplink enhancement further includes: The terminal device supports uplink enhancement, and the first to-be-selected cell supports uplink enhancement. That the terminal device cannot perform uplink enhancement further includes: The terminal device does not support uplink enhancement, or the first to-be-selected cell does not support uplink enhancement.

It should be understood that a cell selection criterion for performing cell selection by the terminal device includes Squal>0. Both the third offset parameter and the fourth offset parameter are used to determine Squal. A specific manner of determining Squal by using the third offset parameter may be Squal=B+M1. A specific manner of determining Squal by using the fourth offset parameter may be Squal=B+M2. B is used to represent impact of another factor (for example, reference signal received quality) on Squal. M1 is the third offset parameter. M2 is the fourth offset parameter.

Because the third offset parameter M1 is greater than the fourth offset parameter M2, B+M1>0 is more likely than B+M2>0. In other words, B+M2>0 is less likely than B+M1>0. Compared with a manner of determining Squal by using the third offset parameter M1, in a manner of determining Squal by using the fourth offset parameter M2 to perform cell selection, a higher value of A is required.

A key factor that affects the value of B is a distance between the terminal device and a network device. The closer the distance; the larger the value of B. The farther the distance; the smaller the value of B. According to this solution, if the terminal device cannot perform uplink enhancement, the terminal device determines Squal by using the fourth offset parameter. In this case, if the terminal device needs to access a cell, it indicates that a larger value of B is required. In this case, the terminal device is closer to the network device. In this way, even if the terminal device cannot perform uplink enhancement, because the terminal device is close to the network device and the signal is good, normal communication between the terminal device and the network device can still be ensured.

With reference to the first aspect, in another possible design manner, the third offset parameter is equal to 0, and the fourth offset parameter is less than 0. Alternatively, the third offset parameter is greater than 0, and the fourth offset parameter is less than or equal to 0.

With reference to the first aspect, in another possible design manner, the first offset may include a first-type offset and a second-type offset. The first-type offset may include a first offset parameter and a second offset parameter. Both the first offset parameter and the second offset parameter are used to determine Srxlev. The second-type offset may include a third offset parameter and a fourth offset parameter. Both the third offset parameter and the fourth offset parameter are used to determine Squal. The first offset parameter is greater than the second offset parameter, and the third offset parameter is greater than the fourth offset parameter.

For any first to-be-selected cell in the at least one first to-be-selected cell, the terminal device may determine Srxlev and Squal of the first to-be-selected cell by performing the following step.

If the uplink capability information of the terminal device indicates that the terminal device can perform uplink enhancement, the terminal device determines Srxlev of the first to-be-selected cell by using the first offset parameter in the first-type offset, and determines Squal of the first to-be-selected cell by using the third offset parameter in the second-type offset. If the uplink capability information of the terminal device indicates that the terminal device cannot perform uplink enhancement, or if the uplink capability information indicates that the terminal device cannot perform uplink enhancement, the terminal device determines Srxlev of the first to-be-selected cell by using the second offset parameter in the first-type offset, and determine Squal of the first to-be-selected cell by using the fourth offset parameter in the second-type offset.

With reference to the first aspect, in another possible design manner, the method further includes: The terminal device may obtain indication information of the at least one first to-be-selected cell. The indication information indicates whether a corresponding cell supports uplink enhancement.

In this way, the terminal device determines, based on whether a cell supports uplink enhancement, whether the terminal device can perform uplink enhancement. In this way, the terminal device can conveniently determine, based on the uplink capability information, the cell selection parameter by using a proper first offset, to further determine a suitable cell.

With reference to the first aspect, in another possible design manner, the method further includes: The terminal device may obtain a second offset of at least one second to-be-selected cell. The second offset is used to determine a cell reselection parameter (including Srxlev and/or Squal) of the at least one second to-be-selected cell. Then, the terminal device may determine, based on the uplink capability information of the terminal device, the cell reselection parameter of the at least one second to-be-selected cell by using the second offset. Then, the terminal device may determine a second cell based on the cell reselection parameter. The second cell is one of the at least one second to-be-selected cell.

The second to-be-selected cell includes a first cell and a neighboring cell of the first cell.

According to the foregoing technical solution, when determining the cell reselection parameter (Srxlev and/or Squal) by using the second offset, the terminal device combines the uplink capability information of the terminal device. The uplink capability information of the terminal device may indicate whether the terminal device can perform uplink enhancement. In this way, in this solution, for a terminal device that can perform uplink enhancement, a cell reselection parameter of the terminal device may be different from a cell reselection parameter of the terminal device that cannot perform uplink enhancement. Therefore, in this solution, for the two types of terminal devices, different cell reselection parameters may be used to perform cell selection, to ensure normal communication between the terminal device and the selected cell.

In addition, in this solution, if the terminal device that cannot perform uplink enhancement needs to access a cell, the terminal device needs to be closer to the network device, to meet a cell reselection criterion. In this way, even if the terminal device cannot perform uplink enhancement, because the terminal device is close to the network device and the signal is good, normal communication between the terminal device and the network device can still be ensured. In contrast, for the terminal device that can perform uplink enhancement, when the terminal device is far away from the network device, the terminal device can meet the cell reselection criterion, and then reselect to the second cell. In this case, a service resource of a cell is fully utilized. For the terminal device that supports uplink enhancement, when distances between the terminal device and a plurality of network devices are the same or close to each other, if the terminal device may not meet the cell reselection criterion in a second to-be-selected cell that does not support uplink enhancement, but meet the cell reselection criterion in a second to-be-selected cell that supports uplink enhancement, the terminal device may reselect to the second cell. In this case, continuity of a communication service between the terminal device and the network device is ensured, reliability of mobility management is enhanced, and the service resource of the cell is fully utilized.

With reference to the first aspect, in another possible design, the method further includes: The terminal device may obtain a third offset of at least one second to-be-selected cell. The third offset is used to determine an R value of the at least one second to-be-selected cell. The terminal device may determine, based on the uplink capability information of the terminal device, the R value of the at least one second to-be-selected cell by using the third offset. Then, the terminal device may determine a third cell based on the R value. The third cell is one of the at least one second to-be-selected cell. The R value is a ranking parameter of a ranking criterion. For example, the terminal device may determine an R value of a first cell based on a third offset of the first cell, and determine an R value of each neighboring cell based on a third offset of each neighboring cell of the first cell. Then, the terminal device may sort the R value of the first cell and the R value of the neighboring cell, to determine the third cell.

According to the foregoing technical solution, when determining the R value by using the third offset, the terminal device combines the uplink capability information of the terminal device. The uplink capability information of the terminal device may indicate whether the terminal device can perform uplink enhancement. In this way, in this solution, when the terminal device supports uplink enhancement, for a second to-be-selected cell that supports uplink enhancement and a second to-be-selected cell that does not support uplink enhancement, different R value determining methods are used. In addition, it should be understood that the terminal device may sort an R value of a cell on which the terminal device currently camps and an R value of a neighboring cell. Therefore, in this solution, when the two types of second to-be-selected cells are sorted, different R value determining methods are used, to ensure normal communication between the terminal device and a selected cell.

In addition, in this solution, if the terminal device that cannot perform uplink enhancement needs to access a cell, the terminal device needs to be closer to the network device, to meet a cell reselection criterion. In this way, even if the terminal device cannot perform uplink enhancement, because the terminal device is close to the network device and the signal is good, normal communication between the terminal device and the network device can still be ensured. For the terminal device that can perform uplink enhancement, when distances between the terminal device and a plurality of network devices are the same or close, according to a criterion R, a cell that supports uplink enhancement ranks higher than a cell that does not support uplink enhancement. That is, the terminal device is more prone to camping on the cell that supports uplink enhancement. In this way, reliability of mobility management is enhanced, and a service resource of a cell is fully utilized.

With reference to the first aspect, in another possible design manner, the third offset includes a fifth offset parameter and a sixth offset parameter, and the fifth offset parameter is greater than the sixth offset parameter. For each second to-be-selected cell in the at least one second to-be-selected cell, the terminal device may determine an R value of the second to-be-selected cell by performing the following step.

If the uplink capability information of the terminal device indicates that the terminal device can perform uplink enhancement, the terminal device may determine the R value of the second to-be-selected cell by using a fifth offset parameter in a third offset of the second to-be-selected cell. If the uplink capability information of the terminal device indicates that the terminal device cannot perform uplink enhancement, the terminal device may determine the R value of the second to-be-selected cell by using a sixth offset parameter in a third offset of the second to-be-selected cell.

That the terminal device can perform uplink enhancement includes: The terminal device supports uplink enhancement, and the second to-be-selected cell supports uplink enhancement. That the terminal device cannot perform uplink enhancement includes: The terminal device does not support uplink enhancement, or the second to-be-selected cell does not support uplink enhancement.

With reference to the first aspect, in another possible design manner, the fifth offset parameter is equal to 0, and the sixth offset parameter is less than 0. Alternatively, the fifth offset parameter is greater than 0, and the sixth offset parameter is less than or equal to 0.

According to a second aspect, a cell selection apparatus is provided. The cell selection apparatus includes an obtaining unit and a determining unit.

The obtaining unit is configured to obtain a first offset of at least one first to-be-selected cell. The first offset is used to determine a cell selection parameter of the at least one first to-be-selected cell. The cell selection parameter includes a cell selection receive level value Srxlev and/or a cell selection receive quality value Squal. The determining unit is configured to determine, based on uplink capability information of a terminal device, the cell selection parameter of the at least one first to-be-selected cell by using the first offset. The uplink capability information indicates whether the terminal device can perform uplink enhancement. The determining unit is further configured to determine a first cell based on the cell selection parameter. The first cell is one of the at least one first to-be-selected cell.

With reference to the second aspect, in a possible design manner, the first offset includes a first-type offset, and the first-type offset is used to determine Srxlev.

With reference to the second aspect, in another possible design manner, for any first to-be-selected cell in the at least one first to-be-selected cell, the determining unit determines Srxlev of the first to-be-selected cell by performing the following step:
if the uplink capability information indicates that the terminal device can perform uplink enhancement, determining Srxlev of the first to-be-selected cell by using a first offset parameter in the first-type offset; or if the uplink capability information indicates that the terminal device cannot perform uplink enhancement, determining Srxlev of the first to-be-selected cell by using a second offset parameter in the first-type offset, where the first offset parameter is greater than the second offset parameter, that the terminal device can perform uplink enhancement includes: the terminal device supports uplink enhancement, and the first to-be-selected cell supports uplink enhancement, and that the terminal device cannot perform uplink enhancement includes: the terminal device does not support uplink enhancement, or the first to-be-selected cell does not support uplink enhancement.

With reference to the second aspect, in another possible design manner, the first offset parameter is equal to 0, and the second offset parameter is less than 0. Alternatively, the first offset parameter is greater than 0, and the second offset parameter is less than or equal to 0.

With reference to the second aspect, in another possible design manner, the first offset includes a second-type offset, and the second-type offset is used to determine Squal.

With reference to the second aspect, in another possible design manner, for any first to-be-selected cell in the at least one first to-be-selected cell, the determining unit determines Squal of the first to-be-selected cell by performing the following step:
if the uplink capability information indicates that the terminal device can perform uplink enhancement, determining Squal of the first to-be-selected cell by using a third offset parameter in the second-type offset; or if the uplink capability information indicates that the terminal device cannot perform uplink enhancement, determining Squal of the first to-be-selected cell by using a fourth offset parameter in the second-type offset, where the third offset parameter is greater than the fourth offset parameter, that the terminal device can perform uplink enhancement further includes: the terminal device supports uplink enhancement, and the first to-be-selected cell supports uplink enhancement, and that the terminal device cannot perform uplink enhancement further includes: the terminal device does not support uplink enhancement, or the first to-be-selected cell does not support uplink enhancement.

With reference to the second aspect, in another possible design manner, the third offset parameter is equal to 0, and the fourth offset parameter is less than 0. Alternatively, the third offset parameter is greater than 0, and the fourth offset parameter is less than or equal to 0.

With reference to the second aspect, in another possible design manner, the obtaining unit is further configured to obtain indication information of the at least one first to-be-selected cell. The indication information indicates whether a corresponding cell supports uplink enhancement.

With reference to the second aspect, in another possible design manner, the obtaining unit is further configured to obtain a second offset of at least one second to-be-selected cell. The second offset is used to determine a cell reselection parameter of the at least one second to-be-selected cell. The cell reselection parameter includes Srxlev and/or Squal. The determining unit is further configured to determine, based on the uplink capability information of the terminal device, the cell reselection parameter of the at least one second to-be-selected cell by using the second offset. The determining unit is further configured to determine a second cell based on the cell reselection parameter. The second cell is one of the at least one second to-be-selected cell.

With reference to the second aspect, in another possible design manner, the obtaining unit is further configured to obtain a third offset of at least one second to-be-selected cell. The third offset is used to determine an R value of the at least one second to-be-selected cell. The determining unit is further configured to determine, based on the uplink capability information of the terminal device, the R value of the at least one second to-be-selected cell by using the third offset. The determining unit is further configured to determine a third cell based on the R value. The third cell is one of the at least one second to-be-selected cell.

With reference to the second aspect, in another possible design manner, for each second to-be-selected cell in the at least one second to-be-selected cell, the determining unit determines an R value of the second to-be-selected cell by performing the following step:
if the uplink capability information indicates that the terminal device can perform uplink enhancement, determining the R value of the second to-be-selected cell by using a fifth offset parameter in a third offset of the second to-be-selected cell; or if the uplink capability information indicates that the terminal device cannot perform uplink enhancement, determining the R value of the second to-be-selected cell by using a sixth offset parameter in a third offset of the second to-be-selected cell, where the fifth offset parameter is greater than the sixth offset parameter, that the terminal device can perform uplink enhancement includes: the terminal device supports uplink enhancement, and the second to-be-selected cell supports uplink enhancement, and that the terminal device cannot perform uplink enhancement includes: the terminal device does not support uplink enhancement, or the second to-be-selected cell does not support uplink enhancement.

With reference to the second aspect, in another possible design manner, the fifth offset parameter is equal to 0, and the sixth offset parameter is less than 0. Alternatively, the fifth offset parameter is greater than 0, and the sixth offset parameter is less than or equal to 0.

According to a third aspect, a cell selection apparatus is provided. The cell selection apparatus includes: a processor, where the processor is coupled to a memory; and the memory, configured to store a computer program. The processor is configured to execute the computer program stored in the memory, to enable the cell selection apparatus to perform the cell selection method according to any possible implementation of the first aspect.

In a possible design, the cell selection apparatus according to the fourth aspect may further include a transceiver. The transceiver may be a transceiver circuit or an input/output port. The transceiver may be configured to communicate between the cell selection apparatus and another cell selection apparatus.

In this application, the cell selection apparatus according to the third aspect may be a terminal device or a network device, or a chip (system) or another component or assembly disposed inside the terminal device or the network device.

In addition, for technical effect of the cell selection apparatus according to the third aspect, refer to technical effect of the cell selection method according to any implementation of the first aspect. Details are not described herein again.

According to a fourth aspect, a computer-readable storage medium is provided, including a computer program or instructions. When the computer program or the instructions are run on a computer, the computer is enabled to perform the cell selection method according to any possible implementation of the first aspect.

According to a fifth aspect, a computer program product is provided, including a computer program or instructions. When the computer program or the instructions are run on a computer, the computer is enabled to perform the cell selection method according to any possible implementation of the first aspect.

DESCRIPTION OF EMBODIMENTS

Figure 1:
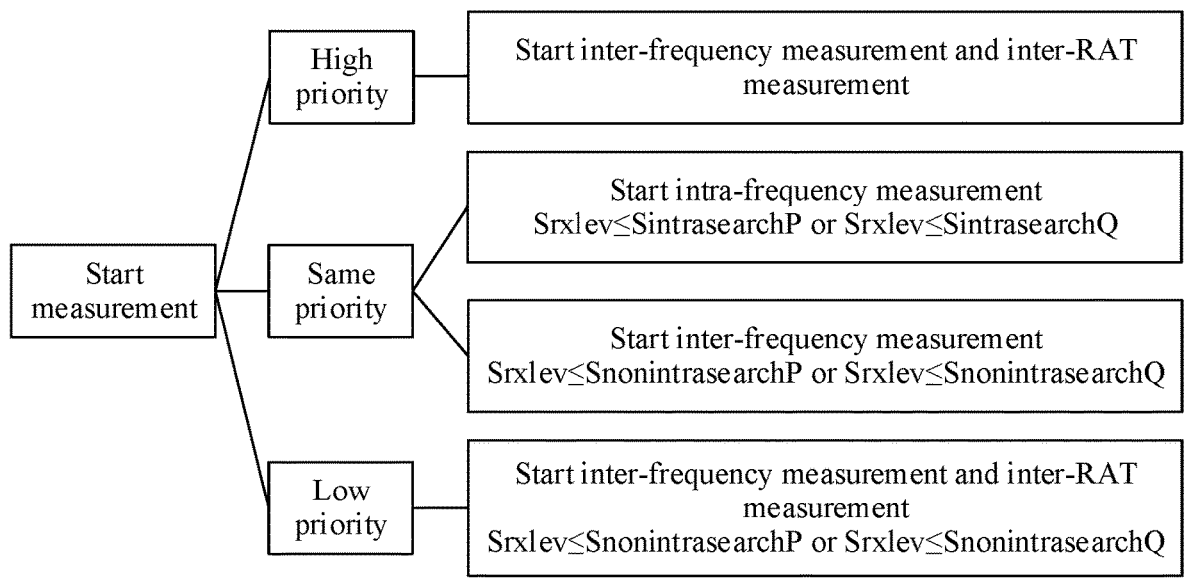
FIG. 1 is a schematic diagram of starting measurement by a terminal device according to an embodiment of this application.

The following describes the technical solutions of this application with reference to the accompanying drawings.

The technical solutions in embodiments of this application may be applied to various communication systems, for example, a wireless fidelity (wireless fidelity, Wi-Fi) system, a vehicle to everything (vehicle-to-everything, V2X) communication system, a device-to-device (device-to-device, D2D) communication system, an internet of vehicles communication system, 4th generation (4th generation, 4G) mobile communication systems such as a long term evolution (long term evolution, LTE) system and a worldwide interoperability for microwave access (worldwide interoperability for microwave access, WiMAX) communication system, 5th generation (5th generation, 5G) mobile communication systems such as a new radio (new radio, NR) system, and future communication systems such as a 6th generation (6th generation, 6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, terms "information (information)", "signal (signal)", "message (message)", "channel (channel)", and "signaling (signaling)" may sometimes be interchangeably used. It should be noted that, meanings expressed by the terms are consistent when differences between the terms are not emphasized. Terms "of (of)", "corresponding (corresponding, relevant)", and "corresponding (corresponding)" may be interchangeably used sometimes. It should be noted that meanings expressed by the terms are consistent when differences of the terms are not emphasized.

In embodiments of this application, a subscript, for example, $W_1$, may sometimes be written in an incorrect form, for example, W1. Expressed meanings are consistent when differences are not emphasized.

To facilitate understanding of the technical solutions in this application, a conventional technology is first described before a cell selection method in embodiments of this application is described in detail.

Conventional technology 1: a cell selection criterion (which may also be referred to as a criterion S).

In a cellular communication system, when being powered on, a terminal device may select a suitable cell from at least one cell for access. After selecting the suitable cell, the terminal device may perform wireless communication with the suitable cell. Specifically, when performing cell selection, the terminal device needs to measure each of the at least one cell, to obtain a measurement result corresponding to each cell. Then, the terminal device may select, based on the measurement result corresponding to each cell, the suitable cell from the at least one cell for access.

For example, the terminal device may determine, according to the cell selection criterion (which may also be referred to as the criterion S), whether a cell is a suitable cell. If a measurement result of the cell meets the following condition, the terminal device determines that the cell meets the criterion S:

cell selection receive level value Srxlev>0 and cell selection receive quality value Squal>0      Condition 1

Srxlev and Squal may separately satisfy the following formulas:

$$Srxlev = Q_{rxlevmeas} - (Q_{rxlevmin} + Q_{rxlevminoffset}) - P_{compensation} - Q_{offsettemp} \quad \text{Formula 1}$$

Srxlev represents the cell selection receive level value, $Q_{rxlevmeas}$ represents a reference signal received power, $Q_{rxlevmin}$ represents a minimum signal received power, $Q_{rxlevminoffset}$ represents an offset of $Q_{rxlevmin}$, $P_{compensation}$ represents a power compensation value, $Q_{offsettemp}$ represents an offset, and N represents a first-type offset.

$$Squal = Q_{qualmeas} - (Q_{qualmin} + Q_{qualminoffset}) - Q_{offsettemp} \quad \text{Formula 2}$$

Squal represents the cell selection receive quality value, $Q_{qualmeas}$ represents reference signal received quality, $Q_{qualmin}$ represents minimum reference signal received quality, $Q_{qualminoffset}$ represents an offset of $Q_{qualmin}$, $Q_{offsettemp}$ represents the offset, and M represents a second-type offset.

It is deduced based on Condition 1 and Formula 1 that $Q_{rxlevmeas} > (Q_{rxlevmin} + Q_{rxlevminoffset}) + P_{compensation} + Q_{offsettemp}$. It is deduced based on Condition 1 and Formula 2 that $Q_{qualmeas} > (Q_{qualmin} + Q_{qualminoffset}) - Q_{offsettemp}$. In other words, when $Q_{rxlevmeas}$ is greater than a threshold (which may be briefly referred to as a power threshold) determined based on the parameters ($Q_{rxlevmin}$, $Q_{rxlevminoffset}$, $P_{compensation}$, and $Q_{offsettemp}$), and $Q_{qualmeas}$ is greater than a threshold (which may be briefly referred to as a quality threshold) determined based on the parameters ($Q_{qualmin}$, $Q_{qualminoffset}$, and $Q_{offsettemp}$), it may be considered that a cell meets the criterion S.

Common technology 2: coverage recovery (coverage recovery).

An uplink transmit power of a terminal device can be increased through coverage recovery (which may also be referred to as uplink enhancement). In other words, the uplink transmit power of the terminal device can be increased by using a series of physical uplink shared channel (Physical Uplink Shared Channel, PUSCH) coverage recovery technologies. A coverage recovery capability (which may also be referred to as an uplink enhancement capability) is an optional capability of the terminal device and a network device. In other words, the terminal device and the network device may support uplink enhancement, or may not support uplink enhancement. When both the terminal device and the network device support uplink enhancement, the uplink transmit power of the terminal device can be increased through uplink enhancement. When the terminal device or the network device does not support uplink enhancement, the uplink transmit power of the terminal device still cannot be increased.

An uplink enhancement technology includes an uplink transmission bundling (bundling) technology;
 a channel estimation technology: a cross-slot channel estimation (cross-slot channel estimation) technology, and a cross-repetition channel estimation (cross-repetition channel estimation) technology;
 low demodulation reference signal density in time domain (lower DM-RS density in time domain);
 repetition: an enhancements on PUSCH repetition (enhancements on PUSCH repetition) technology (for example, an enhancements on PUSCH repetition type A and an enhancements on PUSCH repetition type B), MSG3 initial transmission repetition, and MSG3 retransmission repetition; and
 a frequency hopping across a larger system bandwidth (frequency hopping across a larger system bandwidth) technology, and a BWP switching across a larger system bandwidth (BWP switching across a larger system bandwidth) technology.

Conventional technology 3: cell reselection. Cell reselection can include the following three steps:

Step 1: A terminal device may start to measure a current serving cell (which may also be referred to as a first cell) and neighboring cells (including an intra-frequency cell, an inter-frequency cell, and an inter-RAT cell) based on a threshold. For example, FIG. 1 is a schematic diagram of starting measurement by a terminal device according to an embodiment of this application. For details about FIG. 1, refer to the conventional technology. Details are not described herein again.

Step 2: The terminal device determines whether a signal of the neighboring cell meets a reselection criterion.

Figure 2:
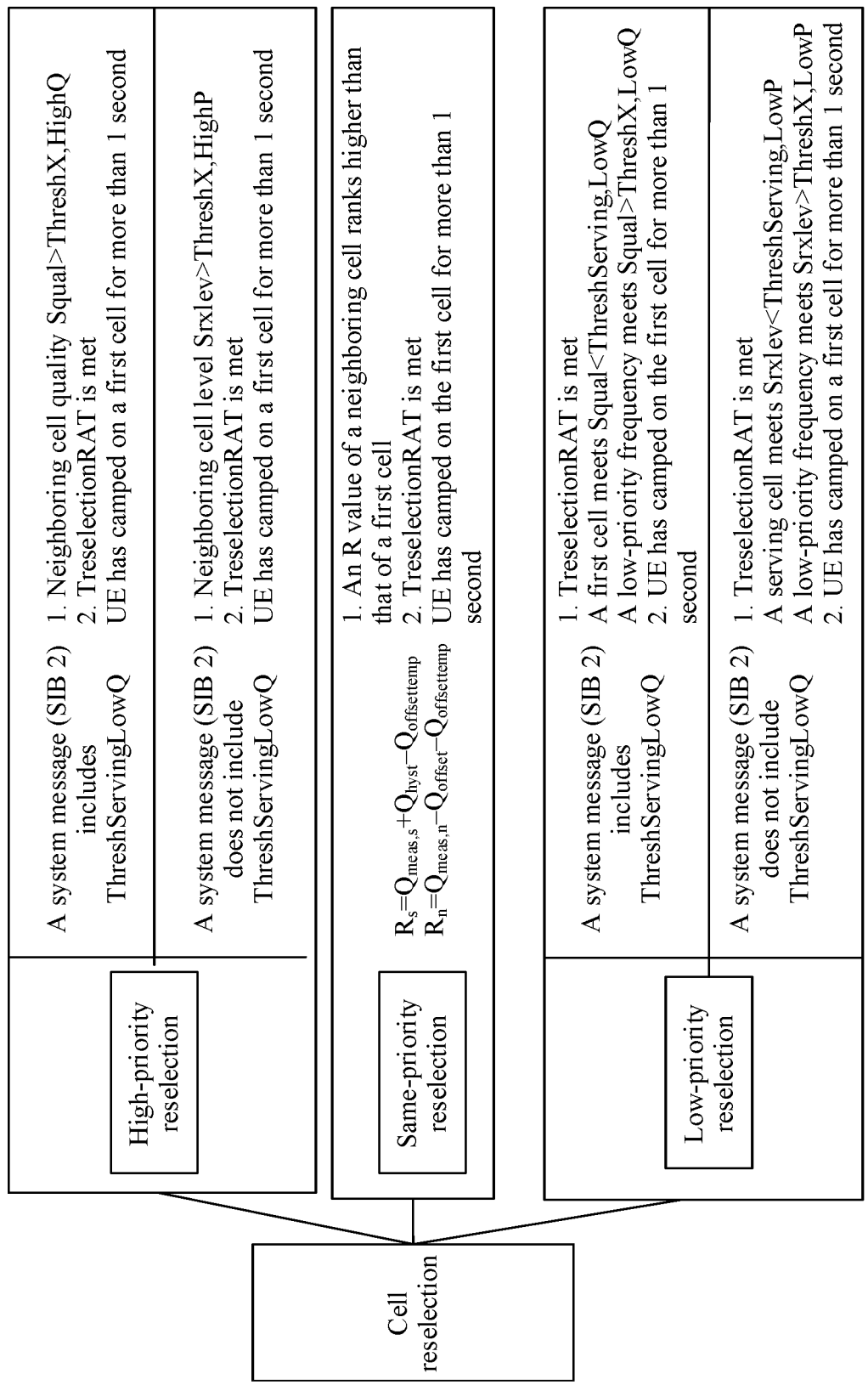
FIG. 2 is a schematic diagram of describing cell reselection according to an embodiment of this application.

FIG. 2 is a schematic diagram of describing cell reselection according to an embodiment of this application. As shown in FIG. 2, when cell reselection is high-priority reselection and a system message (System Information Block (System Information Block, SIB 2)) includes a serving cell quality threshold threshServingLowQ, if neighboring cell quality Squal is greater than a high-priority reselection quality threshold threshX,HighQ, a continuous reselection time parameter treselectionRAT is met, and the terminal device camps on the first cell for more than a time T (for example, the time T is set to 1 second in the conventional technology), the terminal device determines that the signal of the neighboring cell meets the reselection criterion. Alternatively, when cell reselection is high-priority reselection and a system message (SIB 2) does not include threshServingLowQ, if a neighboring cell level Srxlev is greater than a high-priority reselection power threshold threshX,HighP, continuous treselectionRAT is met, and the terminal device camps on the first cell for more than a time T (for example, the time T is set to 1 second in the conventional technology), the terminal device determines that the signal of the neighboring cell meets the reselection criterion.

When cell reselection is same-priority reselection, the terminal device may rank the first cell and the neighboring cell according to a cell rating criterion (a criterion R). If a ranking parameter (briefly referred to as an R value herein) used for a ranking criterion of the neighboring cell ranks higher than an R value of the first cell, continuous treselectionRAT is met, and the terminal device camps on the first cell for more than a time T (for example, the time T is set to 1 second in the conventional technology), the terminal device determines that the signal of the neighboring cell meets the reselection criterion.

Specifically, the R value of the first cell may satisfy the following formula:

$$R_s = Q_{meas,s} + Q_{hyst} - Q_{offsettemp}$$ Formula 3

$R_s$ represents the R value of the first cell, $Q_{meas,s}$ represents a reference signal received power (Reference Signal Received Power, RSRP) measurement quantity used for cell reselection, $Q_{hyst}$ represents a ranking criterion hysteresis factor, and $Q_{offsettemp}$ represents an offset.

An R value of the neighboring cell may satisfy the following formula:

$$R_n = Q_{meas,n} - Q_{offset} - Q_{offsettemp}$$ Formula 4

$R_n$ represents the R value of the neighboring cell, $Q_{meas,s}$ represents the RSRP measurement quantity used for cell reselection, $Q_{offset}$ represents the ranking criterion hysteresis factor, and $Q_{offsettemp}$ represents the offset.

When cell reselection is low-priority reselection and a system message (SIB 2) includes threshServingLowQ, if the first cell meets Squal<threshServing,LowQ, treselectionRAT is met, a low-priority frequency meets Squal>low-priority reselection quality threshold threshX,LowQ, and the terminal device camps on the first cell for more than a time T (for example, the time T is set to 1 second in the conventional technology), the terminal device determines that the signal of the neighboring cell meets the reselection criterion. Alternatively, when cell reselection is low-priority reselection and a system message (SIB 2) does not include threshServingLowQ, if the first cell meets Srxlev<serving cell power threshold threshServing,LowP, treselectionRAT is met, a low-priority frequency meets Srxlev>low-priority reselection power threshold threshX,LowP, and the terminal device camps on the first cell for more than a time T (for example, the time T is set to 1 second in the conventional technology), the terminal device determines that the signal of the neighboring cell meets the reselection criterion.

Step 3: If there is a cell (which may be referred to as a second cell) that meets the reselection criterion, the terminal device starts reselection, receives a system message (for example, there is no access restriction message) of the second cell, and camps on the second cell. If there is no cell that meets the reselection criterion, the terminal device still camps on the first cell.

Massive machine type communication (Massive Machine Type Communication, mMTC) features low power consumption, low latency, and high reliability. In an mMTC service, terminal devices are widely distributed in a large quantity, and power consumption and costs of the terminal devices are low. For example, for a terminal device (which may be referred to as a REDCAP terminal device) in the mMTC service, power consumption and costs of the terminal device can be reduced by reducing a quantity of antennas in the terminal device. However, this results in a decrease of an uplink transmit power of the REDCAP terminal device.

Currently, the uplink transmit power of the terminal device may be increased through uplink enhancement (which may also be referred to as coverage recovery), so that the terminal device can perform wireless communication with a cell within a coverage area of the cell. However, because some terminal devices cannot perform uplink enhancement, when both a terminal device that can perform uplink enhancement and a terminal device that cannot perform uplink enhancement perform cell selection according to the same criterion S (or perform cell reselection according to the criterion R) during cell selection, some terminal devices may fail to perform wireless communication with a selected cell.

Figure 3:
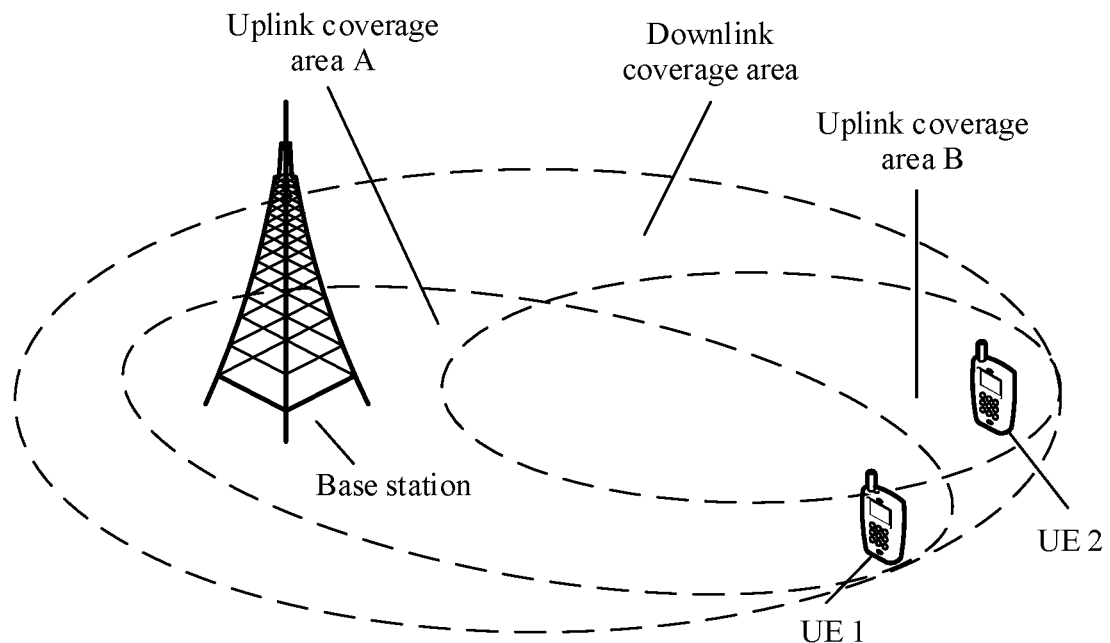
FIG. 3 is a schematic diagram of an architecture of a communication system according to an embodiment of this application.

For example, FIG. 3 is a schematic diagram of an architecture of a communication system according to an embodiment of this application. As shown in FIG. 3, the communication system includes a network device and at least one terminal device. For example, the network device includes a base station A, and the at least one terminal device includes a terminal device 1 and a terminal device 2. Both the terminal device 1 and the terminal device 2 are REDCAP terminal devices. The terminal device 1 can perform uplink enhancement, and the terminal device 2 cannot perform uplink enhancement. Both the terminal device 1 and the terminal device 2 are located in a downlink coverage area of the base station A. In other words, both the terminal device 1 and the terminal device 2 meet a criterion S (to be specific, reference signal received powers of both the terminal device 1 and the terminal device 2 are greater than a power threshold, and reference signal received quality is greater than a quality threshold). An uplink coverage area of the terminal device 1 is an uplink coverage area A, and an uplink coverage area of the terminal device 2 is an uplink coverage area B. It can be learned from FIG. 2 that the terminal device 1 meets the criterion S, and the terminal device 1 can perform uplink enhancement. In other words, an uplink transmit power of the terminal device 1 is high, and the terminal device 1 can perform wireless communication with the base station A. Although the terminal device 2 meets the criterion S, because an uplink transmit power of the terminal device 2 is low (in other words, the uplink coverage area B is small), the terminal device 2 cannot perform wireless communication with the base station A.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Figure 4:
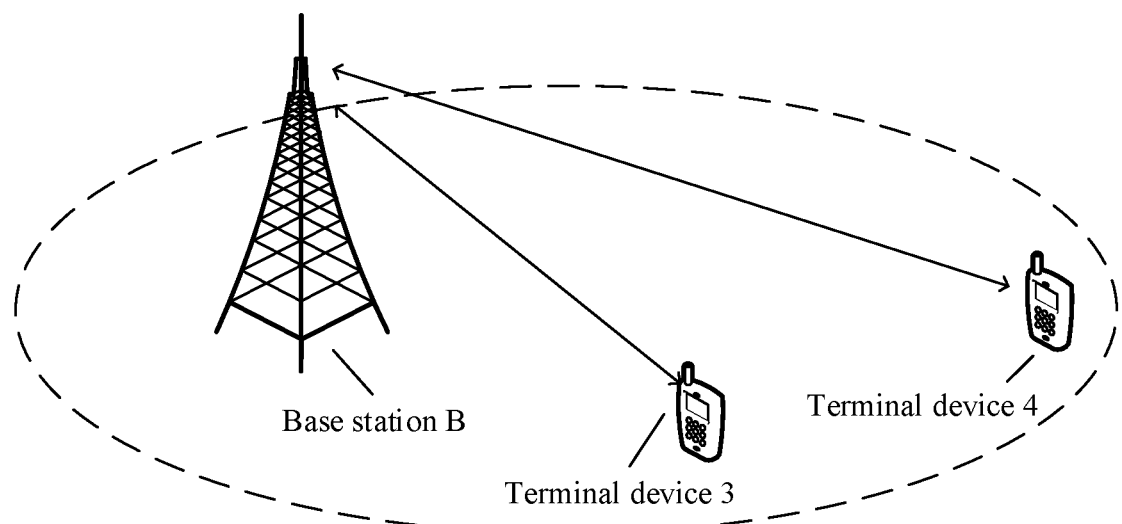
FIG. 4 is a schematic diagram of an architecture of another communication system according to an embodiment of this application.

For ease of understanding embodiments of this application, a communication system shown in FIG. 4 is first used as an example to describe in detail a communication system applicable to embodiments of this application. For example, FIG. 4 is a schematic diagram of an architecture of a communication system to which a cell selection method according to an embodiment of this application is applicable.

As shown in FIG. 4, the communication system includes a network device and a terminal device. For example, the network device includes a base station B, and the terminal device includes a terminal device 3 and a terminal device 4.

The network device is a device that is located on a network side of the communication system and that has a wireless transceiver function, or a chip or a chip system that can be disposed in the device. The network device includes but is not limited to: an access point (access point, AP) in a wireless fidelity (wireless fidelity, Wi-Fi) system, such as a home gateway, a router, a server, a switch, and a bridge, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless relay node, a wireless backhaul node, a transmission point (transmission reception point, TRP; or transmission point, TP), or the like. The network device may alternatively be a gNB or a transmission point (TRP or TP) in a 5G system, for example, a new radio (new radio, NR) system, or one antenna panel or a group of antenna panels (including a plurality of antenna panels) of a base station in a 5G system. The network device may alternatively be a network node, such as a baseband unit (BBU), a distributed unit (distributed unit, DU), or a road side unit (road side unit, RSU) having a base station function, that constitutes a gNB or a transmission point.

The terminal device is a terminal that accesses the communication system and has wireless sending and receiving functions, or a chip or a chip system that can be disposed in the terminal. The terminal device may also be referred to as a user apparatus, an access terminal, a subscriber unit, a subscriber station, a mobile station, a remote station, a remote terminal, a mobile device, user equipment UE, a terminal, a wireless communication device, a user agent, or a user apparatus. The terminal device in embodiments of this application may be a mobile phone (mobile phone), a tablet computer (Pad), a computer having wireless sending and receiving functions, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a vehicle-mounted terminal, an RSU that has a terminal function, or the like. The terminal device in this application may alternatively be an automobile module, an automobile assembly, an on-board component, an automotive chip, or an on-board unit that is built in a vehicle as one or more components or units. The vehicle may implement the cell selection method in this application by using the automobile module, the automobile assembly, the on-board component, the automotive chip, or the on board unit that is built in the vehicle.

It should be noted that the cell selection method provided in embodiments of this application may be applied to communication between the terminal device and the network device shown in FIG. 4. For a specific implementation, refer to the following method embodiments. Details are not described herein again.

It should be noted that, the solutions in embodiments of this application may also be applied to another communication system, and a corresponding name may also be replaced with a name of a corresponding function in the another communication system.

It should be understood that FIG. 4 is merely a simplified schematic diagram of an example for ease of understanding. The communication system may further include another network device and/or another terminal device that are/is not shown in FIG. 4.

The following describes in detail the cell selection method provided in embodiments of this application with reference to FIG. 5 to FIG. 9.

Figure 5:
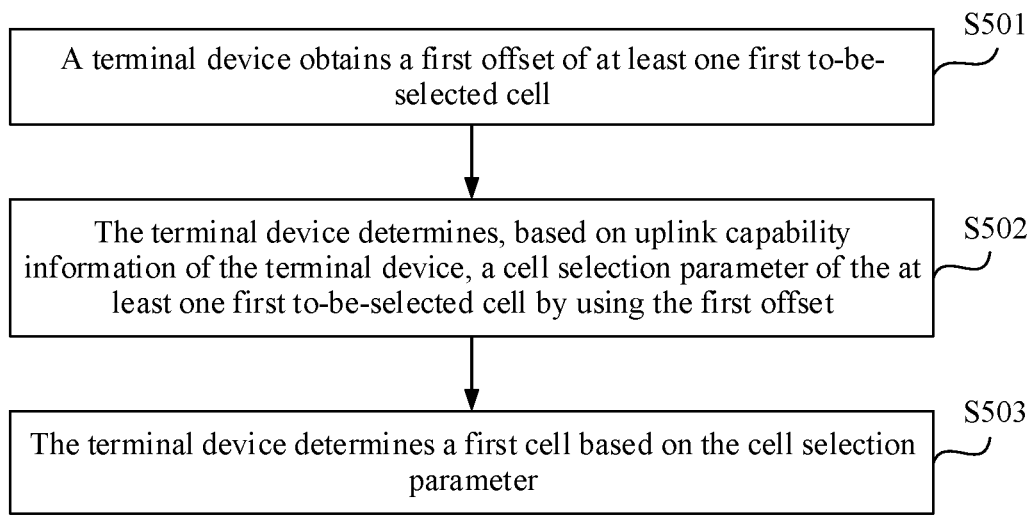
FIG. 5 is a schematic flowchart of a cell selection method according to an embodiment of this application.

For example, FIG. 5 is a schematic flowchart of a cell selection method according to an embodiment of this application. The cell selection method may be applied to communication between the terminal device and the network device shown in FIG. 4. As shown in FIG. 5, the cell selection method includes the following steps.

S501: The terminal device obtains a first offset of at least one first to-be-selected cell.

The first offset is used to determine a cell selection parameter of the at least one first to-be-selected cell. The cell selection parameter includes a cell selection receive level value Srxlev and/or a cell selection receive quality value Squal. In other words, the terminal may determine Srxlev and/or Squal of a first to-be-selected cell based on a first offset of the first to-be-selected cell.

In this embodiment of this application, the first offset includes a first-type offset and/or a second-type offset. The first-type offset is used to determine Srxlev, and the second-type offset is used to determine Squal.

It should be noted that the first-type offset and the second-type offset each may include one or more offset parameters. In other words, the first offset may include the one or more offset parameters.

In a possible design, the first offset includes the first-type offset, and the first-type offset includes the one or more offset parameters. For example, a first-type offset of a to-be-selected cell A includes adjustValue1, and adjustValue1 may be used to determine Srxlev of the to-be-selected cell A. For another example, a first-type offset of a to-be-selected cell A includes adjustValue1 and adjustValue2, and adjustValue1 and adjustValue2 may be used to determine Srxlev of the to-be-selected cell A.

In another possible design, the first offset includes the second-type offset, and the second-type offset includes one or more offset parameters. For example, a second-type offset of a to-be-selected cell A includes adjustValue1, and adjustValue1 may be used to determine Squal of the to-be-selected cell A. For another example, a second-type offset of a to-be-selected cell A includes adjustValue1 and adjustValue2, and adjustValue1 and adjustValue2 may be used to determine Squal of the to-be-selected cell A.

In another possible design, the first offset includes the first-type offset and the second-type offset, and the first-type offset and the second-type offset each include the one or more offset parameters. For example, a first-type offset of a to-be-selected cell A includes adjustValue1, and a second-type offset includes adjustValue2. adjustValue1 may be used to determine Srxlev of the to-be-selected cell A, and adjustValue2 may be used to determine Squal of the to-be-selected cell A. For another example, a first-type offset of a to-be-selected cell A includes adjustValue1 and adjustValue2, and a second-type offset includes adjustValue3. adjustValue1 and adjustValue2 may be used to determine Srxlev of the to-be-selected cell A, and adjustValue3 may be used to determine Squal of the to-be-selected cell A.

It should be noted that the first offset may represent a power value, a level value, a quality value, or the like. This is not limited in this embodiment of this application. In addition, the offset parameter included in the first offset may be a positive number, or may be 0, or may be a negative number. For example, the first offset includes 1 decibel relative to one milliwatt (decibel relative to one milliwatt, dBm). For another example, the first offset includes 0 dBm and −3 dBm. For another example, the first offset includes 3 dBm and −5 dBm.

In a possible implementation, the network device may broadcast adjustment information of a cell corresponding to the network device. The adjustment information includes the first offset. The terminal device may receive the adjustment information from the network device, and obtain the first offset of the cell. The adjustment information may be located in system information. For example, the adjustment information may be located in a master information block (Master Information Block, MIB), a SIB 1, or a SIB 2. For example, the adjustment information may be located in a cellSelectionInfo field in the SIB 1.

S502: The terminal device determines, based on uplink capability information of the terminal device, the cell selection parameter of the at least one first to-be-selected cell by using the first offset.

The uplink capability information indicates whether the terminal device can perform uplink enhancement.

It should be noted that whether the terminal device can perform uplink enhancement is related to whether the terminal device and a cell support uplink enhancement. If both the terminal device and the cell support uplink enhancement, the terminal device can perform uplink enhancement. If the terminal device does not support uplink enhancement, and/ or the cell does not support uplink enhancement, the terminal device cannot perform uplink enhancement. In other words, that the terminal device cannot perform uplink enhancement may be classified into the following three cases.

Case 1: If the terminal device does not support uplink enhancement but the cell supports uplink enhancement, the terminal device cannot perform uplink enhancement. Case 2: If the terminal device supports uplink enhancement but the cell does not support uplink enhancement, the terminal device cannot perform uplink enhancement. Case 3: If neither the terminal device nor the cell supports uplink enhancement, the terminal device cannot perform uplink enhancement. It should be noted that, for specific descriptions of a process in which the terminal device determines whether the terminal device can perform uplink enhancement, refer to S601 to S604. Details are not described herein again.

In a possible implementation, the first offset includes the first-type offset, and the first-type offset is used to determine Srxlev. The terminal device determines, based on the uplink capability information of the terminal device, Srxlev of the first to-be-selected cell by using the first-type offset.

Srxlev may satisfy the following formula:

$$Srxlev = Q_{rxlevmeas} - (Q_{rxlevmin} + Q_{rxlevminoffset}) - P_{compensation} - Q_{offsettemp} + N \quad \text{Formula 5}$$

Srxlev represents the cell selection receive level value, $Q_{rxlevmeas}$ represents a reference signal received power, $Q_{rxlevmin}$ represents a minimum signal received power, $Q_{rxlevminoffset}$ represents an offset of $Q_{rxlevmin}$, $P_{compensation}$ represents a power compensation value, $Q_{offsettemp}$ represents an offset, and N represents the first-type offset.

With reference to Condition 1, Formula 2, and Formula 5, Condition 2 may be obtained:

$$Q_{rxlevmeas} > (Q_{rxlevmin} + Q_{rxlevminoffset}) + P_{compensation} + Q_{offsettemp} - N \quad \text{Condition } 2_1$$

$$Q_{qualmeas} > (Q_{qualmin} + Q_{qualminoffset}) - Q_{offsettemp} \quad \text{Condition } 2_2$$

Condition 2 includes Condition $2_1$ and Condition $2_2$.

In some embodiments, the first-type offset includes a first offset parameter and a second offset parameter. If the uplink capability information indicates that the terminal device can perform uplink enhancement, the terminal device determines Srxlev of the first to-be-selected cell by using the first offset parameter in the first-type offset. If the uplink capability information indicates that the terminal device cannot perform uplink enhancement, the terminal device determines Srxlev of the first to-be-selected cell by using the second offset parameter in the first-type offset.

The first offset parameter is greater than the second offset parameter. In other words, a power threshold at which the terminal device can perform uplink enhancement is less than a power threshold at which the terminal device cannot perform uplink enhancement.

It should be noted that, when a power threshold is larger, Condition 2 can be met only when $Q_{rxlevmeas}$ is larger (in other words, the terminal device is close to the network device, and a measurement value of a downlink reference signal received power is large). Therefore, when the terminal device cannot perform uplink enhancement (in other words, an uplink transmit power of the terminal device is low) and the power threshold is larger, it can be ensured that $Q_{rxlevmeas}$ is greater than the power threshold when the terminal device can be as close to the network device as possible, that is, as close to a coverage center as possible (that is, $Q_{rxlevmeas}$ is increased). In this way, it can be ensured that a terminal device with a low uplink transmit power can still perform wireless communication with the network device.

When a power threshold is smaller, Condition 2 can be met when $Q_{rxlevmeas}$ is smaller (in other words, the terminal device is far away from the network device). Therefore, when the terminal device can perform uplink enhancement (in other words, an uplink transmit power of the terminal device is high) and the power threshold is smaller, it can be ensured that $Q_{rxlevmeas}$ is greater than the power threshold when the terminal device is far away from the network device (that is, $Q_{rxlevmeas}$ is decreased). In this way, the terminal device can more accurately determine uplink and downlink coverage areas of the network device. This ensures normal communication between the terminal device and the network device, and allows a service resource of a cell to be fully utilized, to avoid waste of the resource of the cell.

In a possible design, the first offset parameter is equal to 0, and the second offset parameter is less than 0. The first offset parameter is equal to 0. In other words, Formula 4 is the same as Formula 1. In other words, Srxlev is not changed.

It may be understood that, when the terminal device (for example, a REDCAP terminal) can perform uplink enhancement, an uplink transmit power of the REDCAP terminal obtained by performing uplink enhancement may be the same as an uplink transmit power of a terminal (which may be referred to as a normal terminal device) whose capability is not decreased. Therefore, the terminal device can perform wireless communication with the network device when Condition 1 (namely, a conventional criterion S) is met.

If the first offset parameter is less than 0 (the first offset parameter is a negative number), it indicates that the power threshold is increased (or a measurement value $Q_{rxlevmeas}$ for determining the criterion S is decreased). In this case, when the terminal device (for example, a REDCAP terminal) cannot perform uplink enhancement, the REDCAP terminal needs to meet a high power threshold. Therefore, Condition 4 can be met when the REDCAP terminal needs to be close to the network device. In this way, it can be ensured that a terminal device with a low uplink transmit power can still perform wireless communication with the network device.

In another possible design, the first offset parameter is greater than 0, and the first offset parameter is less than or equal to 0.

It should be noted that, if the first offset parameter is greater than 0 (the first offset parameter is a positive number), it indicates that the power threshold is decreased (or a measurement value $Q_{rxlevmeas}$ for determining the criterion S is increased). In this case, when the terminal device can perform uplink enhancement, the terminal device needs to meet a low power threshold. Therefore, Condition 4 can be met when the terminal device is far away from the network device. In this way, the service resource of the cell can be fully utilized, to avoid waste of the resource of the cell.

If the first offset parameter is less than 0, it indicates that the power threshold is increased (or the measurement value $Q_{rxlevmeas}$ for determining the criterion S is decreased). For example, when the REDCAP terminal cannot perform uplink enhancement, the REDCAP terminal needs to meet the high power threshold. Therefore, Condition 4 can be met when the REDCAP terminal needs to be close to the network device. In this way, even if the uplink transmit power of the REDCAP terminal is low, the REDCAP terminal can still perform wireless communication with the network device. The first offset parameter is equal to 0. In other words, Formula 4 is the same as Formula 1. In other words, Srxlev is not changed. For example, when the normal terminal device cannot perform uplink enhancement, the terminal device can perform wireless communication with the network device when Condition 1 (namely, the conventional criterion S) is met.

In addition, a value of the first-type offset is related to a value of the uplink transmit power of the terminal device. In other words, the power threshold (or $Q_{rxlevmeas}$) is related to the value of the uplink transmit power of the terminal device.

Example 1: Because of different uplink enhancement technologies, the uplink transmit power of the terminal is increased by different values. The different uplink enhancement technologies correspond to different first offset parameters.

For example, Table 1 shows a correspondence between an uplink enhancement technology and the first offset parameter. Uplink transmission bundling enhancement capability<uplink transmission repetition enhancement capability<uplink transmission bundling+uplink transmission repetition enhancement capability.

TABLE 1

| Uplink enhancement technology | First offset parameter |
| --- | --- |
| Uplink transmission bundling | First offset parameter A |
| Uplink transmission repetition | First offset parameter B |
| Uplink transmission bundling + uplink transmission repetition | First offset parameter C |

In other words, if the REDCAP terminal performs uplink enhancement by using uplink transmission bundling, the first offset parameter is the first offset parameter A. If the REDCAP terminal performs uplink enhancement by using uplink transmission repetition, the first offset parameter is the first offset parameter B. If the REDCAP terminal performs uplink enhancement by using uplink transmission bundling and uplink transmission repetition, the first offset parameter is the first offset parameter C. The first offset parameter A is less than 0 (a negative number), the first offset parameter B is equal to 0, and the first offset parameter C is greater than 0 (a positive number).

It should be noted that, because an uplink transmit power of the REDCAP terminal obtained by performing uplink enhancement by using uplink transmission bundling is still less than the uplink transmit power of the normal terminal device, the first offset parameter is a negative number, to increase the power threshold (or decrease $Q_{rxlevmeas}$), so that when the REDCAP terminal uses uplink transmission bundling, Condition 2 can be met only when the REDCAP terminal can be close to the network device. This further ensures that the REDCAP terminal can perform wireless communication with the terminal device when the REDCAP terminal uses uplink transmission bundling.

Because an uplink transmit power of the REDCAP terminal obtained by performing uplink enhancement by using uplink transmission repetition is equal to the uplink transmit power of the normal terminal device, the first offset parameter is equal to 0, and the power threshold (or $Q_{rxlevmeas}$) is not changed.

Because an uplink transmit power of the REDCAP terminal obtained by performing uplink enhancement by using uplink transmission bundling and uplink transmission repetition is greater than the uplink transmit power of the normal terminal device, the first offset parameter is a positive number, to decrease the power threshold (or increase $Q_{rxlevmeas}$), so that when the REDCAP terminal uses uplink transmission bundling and uplink transmission repetition, Condition 2 can still be met when the REDCAP terminal is far away from the network device.

Example 2: Because different REDCAP terminals have different application scenarios or hardware configurations (for example, different quantities of transmit antennas), uplink transmit powers of different REDCAP terminals decreases to different degrees. Therefore, if the REDCAP terminal cannot perform uplink enhancement, different degrees to which the uplink transmit powers are decreased correspond to different second offset parameters.

For example, Table 2 shows a correspondence between a quantity of transmit antennas/an antenna capability and the second offset parameter.

TABLE 2

| Quantity of transmit antennas/Antenna capability | Second offset parameter |
| --- | --- |
| A1 | Second offset parameter A |
| A2 | Second offset parameter B |

In other words, when a quantity of transmit antennas quantity/an antenna capability of the REDCAP terminal is A1, the second offset parameter is the second offset parameter A. When a quantity of transmit antennas/an antenna capability of the REDCAP terminal is A2, the second offset parameter is the second offset parameter B.

A1 and A2 are both positive integers, and A1 is greater than A2. The second offset parameter A is greater than the second offset parameter B. For example, the second offset parameter A is −3, and the second offset parameter B is −5

It may be understood that, when a quantity of transmit antennas/an antenna capability of a REDCAP terminal 1 is A1 and a quantity of transmit antennas/an antenna capability of a REDCAP terminal 2 is A2, neither the REDCAP terminal 1 nor the REDCAP terminal 2 can perform uplink enhancement. Because A1 is greater than A2, an uplink transmit power of the REDCAP terminal 1 is greater than an uplink transmit power of the REDCAP terminal 2, a power threshold of the REDCAP terminal 1 is low, and a power threshold of the REDCAP terminal 2 is high (in other words, the REDCAP terminal 2 is closer to the network device than the REDCAP terminal 1). In this way, it can be ensured that the REDCAP terminal 2 can perform wireless communication with the network device.

Alternatively, Srxlev may satisfy the following formula:

$$Srxlev = Q_{rxlevmeas} - (Q_{rxlevmin} + Q_{rxlevminoffset}) - \max(P_{EMAX1} - P_{PowerClass} - N, 0) - Q_{offsettemp} \quad \text{Formula 6}$$

$P_{EMAX1}$ represents a maximum uplink transmit power of a cell, $P_{PowerClass}$ represents a maximum output power of the terminal device, and N represents the first-type offset.

It should be noted that, for descriptions of the first-type offset in Formula 6 and descriptions of a condition obtained by combining Formula 6 with Condition 1 and Formula 2, refer to the foregoing descriptions with reference to Formula 5. Details are not described herein again.

In another possible implementation, the first offset includes the second-type offset, and the second-type offset is used to determine Squal. The terminal device determines, based on the uplink capability information of the terminal device, Squal of the first to-be-selected cell by using the second-type offset.

Squal may satisfy the following formula:

$$Squal = Q_{qualmeas} - (Q_{qualmin} + Q_{qualminoffset}) - Q_{offsettemp} + M \quad \text{Formula 7}$$

Squal represents the cell selection receive quality value, $Q_{qualmeas}$ represents reference signal received quality, $Q_{qualmin}$ represents minimum reference signal received quality, $Q_{qualminoffset}$ represents an offset of $Q_{qualmin}$, $Q_{offsettemp}$ represents an offset, and M represents the second-type offset.

With reference to Condition 1, Formula 1, and Formula 7, Condition 3 may be obtained:

$$Q_{rxlevmeas} > (Q_{rxlevmin} + Q_{rxlevminoffset}) + P_{compensation} + Q_{offsettemp} \quad \text{Condition } 3_1$$

$$Q_{qualmeas} > (Q_{qualmin} + Q_{qualminoffset}) - Q_{offsettemp} - M \quad \text{Condition } 3_2$$

Condition 3 includes Condition $3_1$ and Condition $3_2$.

In some embodiments, the second-type offset includes a third offset parameter and a fourth offset parameter. If the uplink capability information indicates that the terminal device can perform uplink enhancement, the terminal device determines Squal of the first to-be-selected cell by using the third offset parameter in the second-type offset. If the uplink capability information indicates that the terminal device cannot perform uplink enhancement, the terminal device determines Squal of the first to-be-selected cell by using the fourth offset parameter in the second-type offset.

The third offset parameter is greater than the fourth offset parameter. In other words, a quality threshold at which the terminal device can perform uplink enhancement is less than a quality threshold at which the terminal device cannot perform uplink enhancement.

It may be understood that, when a quality threshold is larger, Condition 3 can be met only when $Q_{qualmeas}$ is larger (in other words, the terminal device is close to the network device). Therefore, when the terminal device cannot perform uplink enhancement (in other words, an uplink transmit power of the terminal device is low) and the quality threshold is larger, it can be ensured that $Q_{qualmeas}$ is greater than the quality threshold when the terminal device can be as close to the network device as possible, that is, as close to a coverage center as possible (that is, $Q_{qualmeas}$ is increased). In this way, even if the uplink transmit power of the terminal device is low, the terminal device can still perform wireless communication with the network device.

When a quality threshold is smaller, Condition 3 can be met when $Q_{qualmeas}$ is smaller (in other words, the terminal device is far away from the network device). Therefore, when the terminal device can perform uplink enhancement (in other words, an uplink transmit power of the terminal device is high) and the quality threshold is smaller, it can be ensured that $Q_{qualmeas}$ is greater than the quality threshold when the terminal device is far away from the network device (that is, $Q_{qualmeas}$ is decreased). In this way, the service resource of the cell can be fully utilized, to avoid waste of the resource of the cell.

In a possible design, the third offset parameter is equal to 0, and the fourth offset parameter is less than 0. In another possible design, the third offset parameter is greater than 0, and the fourth offset parameter is less than or equal to 0.

It should be noted that, for specific descriptions of the second-type offset, refer to the foregoing descriptions of the first-type offset. Details are not described herein again.

In another possible implementation, the first offset includes the first-type offset and the second-type offset. The terminal device determines, based on the uplink capability information of the terminal device, Srxlev of the first to-be-selected cell by using the first-type offset, and determines, based on the uplink capability information of the terminal device, Squal of the first to-be-selected cell by using the second-type offset.

Srxlev may satisfy Formula 5, and Squal may satisfy Formula 7.

With reference to Condition 1, Formula 5, and Formula 7, Condition 4 may be obtained:

$$Q_{rxlevmeas} > (Q_{rxlevmin} + Q_{rxlevminoffset}) + P_{compensation} + Q_{offsettemp} - N \quad \text{Condition } 4_1$$

$$Q_{qualmeas} > (Q_{qualmin} + Q_{qualminoffset}) - Q_{offsettemp} - M \quad \text{Condition } 4_2$$

Condition 4 includes Condition $4_1$ and Condition $4_2$.

It should be noted that, for descriptions of the foregoing parameters, refer to the foregoing descriptions of Formula 5 and Formula 7. Details are not described herein again. For specific descriptions of the first-type offset and the second-type offset in Condition 4, refer to the foregoing descriptions of the first-type offset and the second-type offset. Details are not described herein again.

S503: The terminal device determines a first cell based on the cell selection parameter.

The first cell is one of the at least one first to-be-selected cell.

In a possible implementation, the terminal device may determine the first cell based on Srxlev in Formula 5 and Squal in Formula 2. In other words, the first cell meets Condition 2.

In another possible implementation, the terminal device may determine the first cell based on Srxlev in Formula 1 and Squal in Formula 7. In other words, the first cell meets Condition 3.

In another possible implementation, the terminal device may determine the first cell based on Srxlev in Formula 5 and Squal in Formula 7. In other words, the first cell meets Condition 4.

According to the foregoing technical solution, when determining the cell selection parameter (Srxlev and/or Squal) by using the first offset, the terminal device combines the uplink capability information of the terminal device. The uplink capability information of the terminal device may indicate whether the terminal device can perform uplink enhancement. In this way, in this solution, for a terminal device that can perform uplink enhancement, a cell selection parameter of the terminal device may be different from a cell selection parameter of the terminal device that cannot perform uplink enhancement. Therefore, in this solution, for the two types of terminal devices, different cell selection parameters may be used to perform cell selection, to ensure normal communication between the terminal device and a selected cell.

Figure 6:
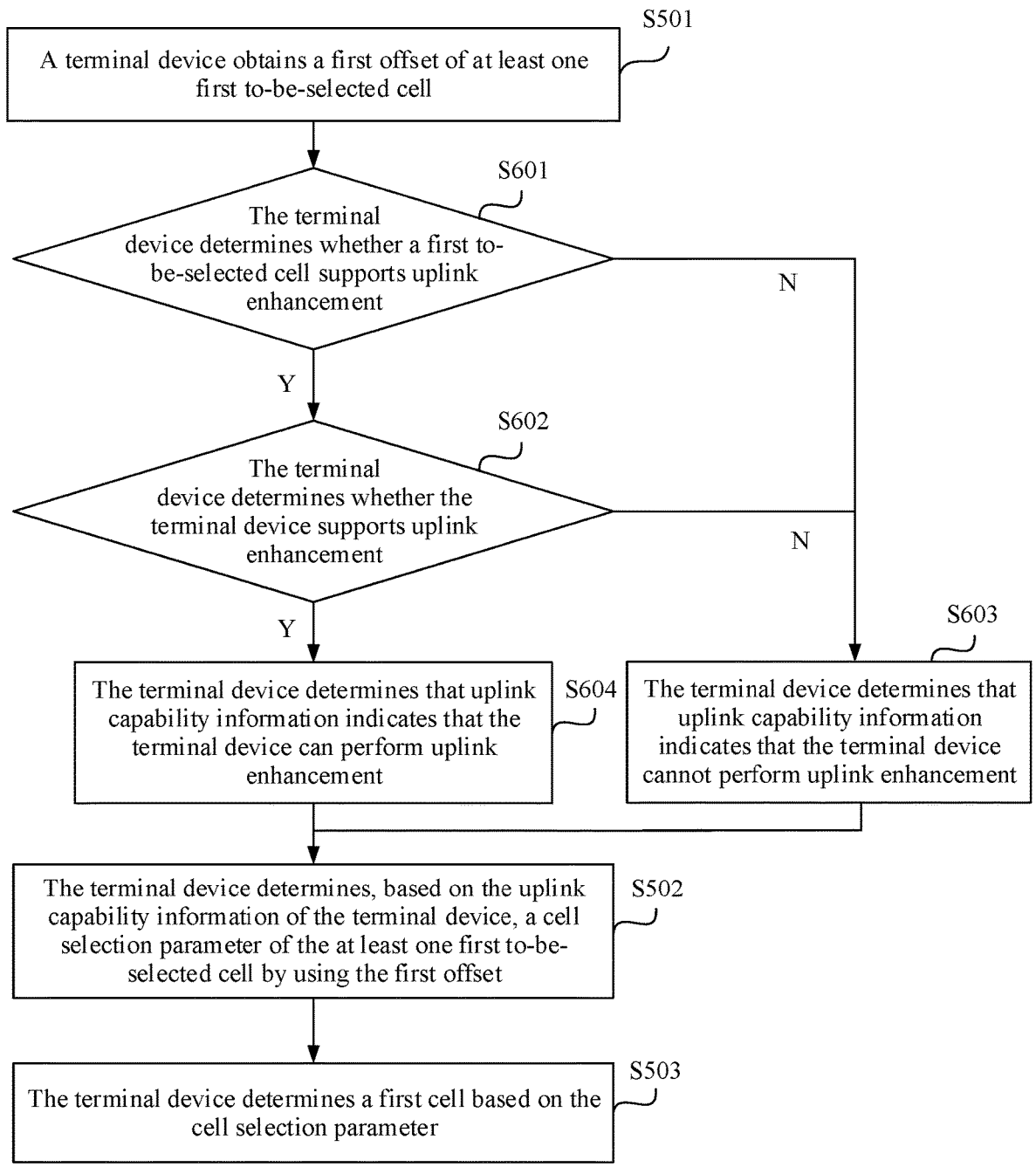
FIG. 6 is a schematic flowchart of a method for determining uplink capability information according to an embodiment of this application.

The following describes the process in which the terminal device determines whether the terminal device can perform uplink enhancement. FIG. 6 is a schematic flowchart of a method for determining uplink capability information according to an embodiment of this application. As shown in FIG. 6, the method for determining the uplink capability information includes the following steps.

S601: The terminal device determines whether the first to-be-selected cell supports uplink enhancement.

In a possible implementation, the terminal device may obtain indication information of the first to-be-selected cell. The indication information indicates whether the first to-be-selected cell supports uplink enhancement. The terminal device determines, based on the indication information, whether the first to-be-selected cell supports uplink enhancement.

The indication information may be located in the system information. For example, the indication information may be located in the MIB, the SIB 1, or the SIB 2. For example, the network device may broadcast the system information. Then, the terminal device may receive the system information from the network device, obtain the indication information, and determine whether the first to-be-selected cell supports uplink enhancement. For example, the indication information includes 0 and 1. When the indication information is 0, the indication information indicates that the first to-be-selected cell does not support uplink enhancement. When the indication information is 1, the indication information indicates that the first to-be-selected cell supports uplink enhancement.

In another possible implementation, an indication field may be added to cell information of the first to-be-selected cell, and the indication field indicates whether a corresponding cell supports uplink enhancement. The terminal determines, based on the indication field in the cell information, whether the first to-be-selected cell supports uplink enhancement.

In another possible implementation, an implicit indication method may indicate whether a corresponding cell supports uplink enhancement. For example, when the system information includes the first offset, it is determined that the first to-be-selected cell supports uplink enhancement.

In another possible implementation, a correspondence between frequency information of a cell and whether the cell supports uplink enhancement may be agreed in a protocol. The terminal device may determine, according to the protocol, whether the first to-be-selected cell supports uplink enhancement. For example, the terminal device may obtain frequency information of the first to-be-selected cell, and determine, according to the protocol, whether the first to-be-selected cell supports uplink enhancement.

For example, Table 3 shows the correspondence between the frequency information of the cell and whether the cell supports uplink enhancement. 1 indicates that the cell supports uplink enhancement, and 0 indicates that the cell does not support uplink enhancement.

TABLE 3

| Frequency information of the cell | Indicates whether the cell supports uplink enhancement. |
|---|---|
| 1880 MHz (Mega Hertz, MHz)-1920 MHz | 1 |
| 2300 MHz-2400 MHz | 0 |
| 2570 MHz-2620 MHz | 1 |

In other words, when the frequency information of the cell is 1880 MHz-1920 MHz, the cell supports uplink enhancement. If the frequency information of the cell is 2300 MHz-2400 MHz, the cell does not support uplink enhancement. If the frequency information of the cell is 2570 MHz-2620 MHz, the cell supports uplink enhancement.

In a possible design, if the terminal device determines that the first to-be-selected cell supports uplink enhancement, the terminal device performs S602. If the terminal device determines that the first to-be-selected cell does not support uplink enhancement, the terminal device performs S603.

It should be noted that, if it is an optional feature that the first to-be-selected cell supports uplink enhancement (to be specific, the first to-be-selected cell may support uplink enhancement, or may not support uplink enhancement), the terminal device needs to determine whether the first to-be-selected cell supports uplink enhancement (S601 is performed). If it is a mandatory feature that the first to-be-selected cell supports uplink enhancement (to be specific, the terminal device considers that the first to-be-selected cell supports uplink enhancement), the terminal device does not need to determine whether the first to-be-selected cell supports uplink enhancement (S601 is not performed).

S602: The terminal device determines whether the terminal device supports uplink enhancement.

It should be noted that whether the terminal device supports uplink enhancement is related to a hardware apparatus and configuration information of the terminal device. The terminal device may obtain information about whether the terminal device supports uplink enhancement, for example, UE type information (for example, REDCAP UE or MTC UE), registration information in a SIM card, software version configuration information, and/or configuration information set by a user.

In a possible design, if the terminal device determines that the terminal device supports uplink enhancement, the terminal device performs S604. If the terminal device determines that the terminal device does not support uplink enhancement, the terminal device performs S603.

It should be noted that, if it is an optional feature that the terminal device supports uplink enhancement (to be specific, the terminal device may support uplink enhancement, or may not support uplink enhancement), the terminal device needs to determine whether the terminal device supports uplink enhancement (S602 is performed). If it is a mandatory feature that the terminal device supports uplink enhancement (to be specific, the terminal device considers that the terminal device supports uplink enhancement), the terminal device does not need to determine whether the terminal device supports uplink enhancement (S602 is not performed).

In other words, if it is an optional feature that the first to-be-selected cell supports uplink enhancement, and it is an optional feature that the terminal device supports uplink enhancement, the terminal device performs S601 and S602. If it is a mandatory feature that the first to-be-selected cell supports uplink enhancement and it is an optional feature that the terminal device supports uplink enhancement, the terminal device does not perform S601, but performs only S602. If it is an optional feature that the first to-be-selected cell supports uplink enhancement and it is a mandatory feature that the terminal device supports uplink enhancement, the terminal device does not perform S601, but performs only S602.

It should be noted that a sequence of performing S601 and S602 is not limited in this embodiment of this application. In other words, the terminal device may first perform S601, and then perform S602. Alternatively, the terminal device may first perform S602, and then perform S601. Alternatively, the terminal device may simultaneously perform S601 and S602.

For example, the terminal device first performs S602. If the terminal device determines that the terminal device supports uplink enhancement, the terminal device performs S601. If the terminal device determines that the terminal device does not support uplink enhancement, the terminal device performs S603. The terminal device performs S601. If the terminal device determines that the first to-be-selected cell supports uplink enhancement, the terminal device performs S604. If the terminal device determines that the first to-be-selected cell does not support uplink enhancement, the terminal device performs S603.

S603: The terminal device determines that the uplink capability information indicates that the terminal device cannot perform uplink enhancement.

S604: The terminal device determines that the uplink capability information indicates that the terminal device can perform uplink enhancement.

It may be understood that, by performing S601 to S604, the terminal device can determine whether the terminal device can perform uplink enhancement. In this way, the terminal device can conveniently determine, based on the uplink capability information, the cell selection parameter by using a proper first offset, to further determine a suitable cell.

It should be noted that a sequence of performing S501 and S601 to S604 is not limited in this embodiment of this application. In other words, the terminal device may first perform S501, and then perform S601 to S604. Alternatively, the terminal device may first perform S601 to S604, and then perform S501. Alternatively, the terminal device may simultaneously perform S501 and S601 to S604.

It should be noted that the terminal device may perform S501, S601 to S604, and S502 for any first to-be-selected cell in the at least one first to-be-selected cell. After the terminal device performs S502, if the cell selection parameter of the first to-be-selected cell meets the cell selection criterion, the terminal device determines that the first to-be-selected cell is the first cell (that is, S503 is performed). If the cell selection parameter of the first to-be-selected cell does not meet the cell selection criterion, the terminal device performs S501, S601 to S604, and S502 for another first to-be-selected cell, and so on until the first cell is determined. For example, the terminal device performs S501, S601 to S604, and S502 for the cell A. Then, if a cell selection parameter of the cell A meets the cell selection criterion, the terminal device determines that the cell A is the first cell (namely, a cell on which the terminal device camps). If a cell selection parameter of the cell A does not meet the cell selection criterion, the terminal device performs S501, S601 to S604, and S502 for the cell B. If a cell selection parameter of the cell B meets the cell selection criterion, the terminal device determines that the cell B is the first cell (namely, a cell on which the terminal device camps). If a cell selection parameter of the cell B does not meet the cell selection criterion, the terminal device performs S501, S601 to S604, and S502 for another cell (for example, a cell C), and so on until a cell that meets the cell selection criterion is determined.

Alternatively, the terminal device may obtain a first offset of each first to-be-selected cell (that is, S501). Then, the terminal device performs S601 to S604, S502, and S503. For a specific process, refer to the foregoing steps. Details are not described herein again.

After the terminal device determines the first cell, that is, after the terminal device camps on a cell, the terminal device may further perform cell reselection. To be specific, the terminal device selects, by monitoring signal quality of a neighboring cell and a current cell (namely, the first cell) in an idle mode, a best cell to provide a service. Cell reselection includes high-priority reselection, same-priority reselection, and low-priority reselection.

Figure 7:
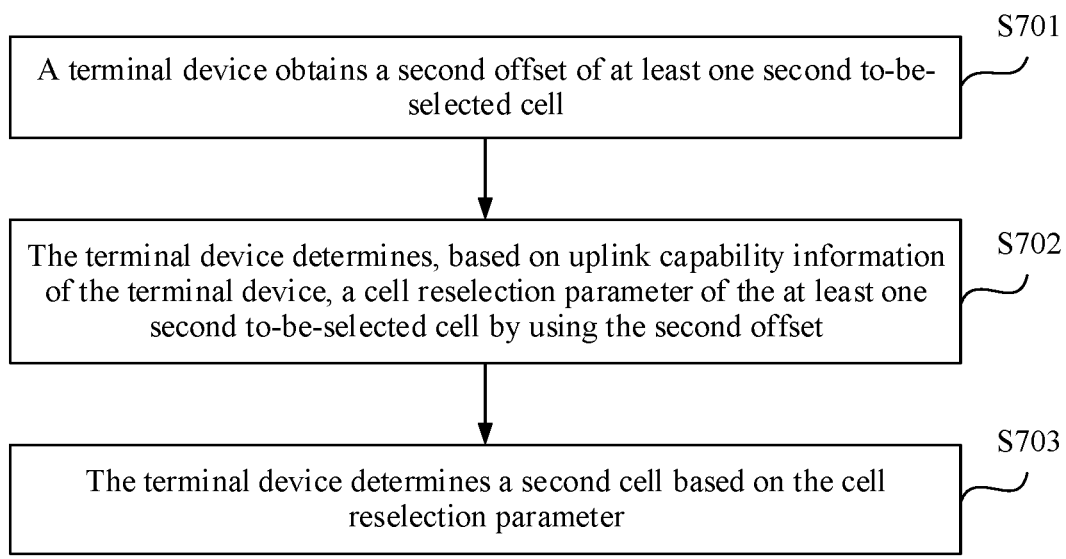
FIG. 7 is a schematic flowchart of another cell selection method according to an embodiment of this application.

The following first describes high-priority reselection and low-priority reselection. For example, FIG. 7 is a schematic flowchart of a cell selection method according to an embodiment of this application. The cell selection method may be applied to communication between the terminal device and the network device shown in FIG. 4.

As shown in FIG. 7, the cell selection method includes the following steps.

S701: The terminal device obtains a second offset of at least one second to-be-selected cell.

The second offset is used to determine a cell reselection parameter of the at least one second to-be-selected cell, and the cell reselection parameter includes Srxlev and/or Squal. In other words, the terminal device may determine Srxlev and/or Squal of the second to-be-selected cell based on the second offset of the second to-be-selected cell.

In this embodiment of this application, the second offset includes a first-type offset and/or a second-type offset. The first-type offset is used to determine Srxlev, and the second-type offset is used to determine Squal.

It should be noted that the second offset of the second to-be-selected cell may be located in the system information, for example, may be located in an SIB 4, an SIB 5, and/or an SIB 6 (respectively corresponding to an intra-frequency neighboring cell, an inter-frequency neighboring cell, and an inter-RAT neighboring cell).

In this embodiment of this application, the at least one second to-be-selected cell includes the first cell and a neighboring cell of the first cell.

In a possible design, the second offset of the at least one second to-be-selected cell includes a second offset of the first cell. In other words, the terminal device obtains only the second offset of the first cell, and does not obtain a second offset of the neighboring cell of the first cell. In this way, the terminal device may determine only whether the first cell supports uplink enhancement, and does not need to determine whether the neighboring cell supports uplink enhancement.

In another possible design, the second offset of the at least one second to-be-selected cell includes a second offset of the first cell and a second offset of the neighboring cell of the first cell. The second offset of the first cell may be located in the SIB 1, and the second offset of the neighboring cell of the first cell may be located in an SIB4, an SIB 5, and/or an SIB 6. In other words, the terminal device obtains a second offset of each second to-be-selected cell. In this way, the terminal device needs to determine whether each second to-be-selected cell supports uplink enhancement.

In a possible implementation, a network device corresponding to the first cell may broadcast adjustment information of the first cell. The adjustment information includes the second offset of the first cell. The terminal device may receive the adjustment information from the network device corresponding to the first cell, and obtain the second offset of the first cell.

In another possible implementation, a network device corresponding to the first cell may broadcast adjustment information of the first cell and the neighboring cell. The adjustment information includes the second offset of the first cell and the second offset of the neighboring cell. The terminal device may receive the adjustment information from the network device corresponding to the first cell, and obtain the second offset of the first cell and the second offset of the neighboring cell.

It should be noted that, for specific descriptions of the second offset, refer to descriptions of the first offset in S501. Details are not described herein again.

S702: The terminal device determines, based on the uplink capability information of the terminal device, the cell reselection parameter of the at least one second to-be-selected cell by using the second offset.

The cell reselection parameter of the second to-be-selected cell includes Srxlev in Formula 5 and Squal in Formula 2, or Srxlev in Formula 1 and Squal in Formula 7, or Srxlev in Formula 5 and Squal in Formula 7.

In a possible implementation, if the terminal device obtains only the second offset of the first cell, the terminal device determines, based on the uplink capability information of the terminal device, a cell reselection parameter of the first cell by using the second offset.

In another possible implementation, if the terminal device obtains the second offset of the first cell and the second offset of the neighboring cell of the first cell, the terminal device determines, based on the uplink capability information of the terminal device, a cell reselection parameter of each second to-be-selected cell by using the second offset.

It should be noted that, for a process in which the terminal device determines, based on the uplink capability information of the terminal device, the cell reselection parameter of the at least one second to-be-selected cell by using the second offset, refer to descriptions in S502. Details are not described herein again.

For specific descriptions of a process in which the terminal device determines whether the terminal device can perform uplink enhancement in the second to-be-selected cell, refer to S801 to S804. Details are not described herein again.

S703: The terminal device determines a second cell based on the cell reselection parameter.

The second cell is one of the at least one second to-be-selected cell, and the at least one second to-be-selected cell further includes the first cell.

In some embodiments, when the terminal device performs high-priority reselection, the terminal device determines the second cell based on Srxlev>ThreshX,HighP of the neighboring cell, or Squal>ThreshX,HighQ of the neighboring cell.

In a possible design, if the terminal device obtains the second offset of the neighboring cell, Srxlev of the neighboring cell is Srxlev in Formula 5, and Squal of the neighboring cell is Squal in Formula 7.

In another possible design, if the terminal device does not obtain the second offset of the neighboring cell, Srxlev of the neighboring cell is Srxlev in Formula 1, and Squal of the neighboring cell is Squal in Formula 2.

In some other embodiments, when the terminal device performs low-priority reselection, the terminal device determines the second cell based on Srxlev<ThreshServing, LowP of the first cell and Srxlev>ThreshX,LowP of the neighboring cell; or the terminal device determines the second cell based on Squal<ThreshServing,LowQ of the first cell and Squal>ThreshX,LowQ of the neighboring cell.

In a possible design, if the terminal device obtains the second offset of the neighboring cell, Srxlev of the first cell and the neighboring cell is Srxlev in Formula 5, and Squal of the first cell and the neighboring cell is Squal in Formula 7.

In another possible design, if the terminal device does not obtain the second offset of the neighboring cell, Srxlev of the neighboring cell is Srxlev in Formula 1, Squal of the neighboring cell is Squal in Formula 2, Srxlev of the first cell is Srxlev in Formula 5, and Squal of the first cell is Squal in Formula 7.

According to the foregoing technical solution, when determining the cell reselection parameter (Srxlev and/or Squal) by using the second offset, the terminal device combines the uplink capability information of the terminal device. The uplink capability information of the terminal device may indicate whether the terminal device can perform uplink enhancement. In this way, in this solution, for a terminal device that can perform uplink enhancement, a cell reselection parameter of the terminal device may be different from a cell reselection parameter of the terminal device that cannot perform uplink enhancement. Therefore, in this solution, for the two types of terminal devices, different cell reselection parameters may be used to perform cell selection, to ensure normal communication between the terminal device and a selected cell.

In addition, in this solution, if the terminal device that cannot perform uplink enhancement needs to access a cell, the terminal device needs to be closer to the network device, to meet a cell reselection criterion. In this way, even if the terminal device cannot perform uplink enhancement, because the terminal device is close to the network device and a signal is good, normal communication between the terminal device and the network device can still be ensured. In contrast, for the terminal device that can perform uplink enhancement, when the terminal device is far away from the network device, the terminal device can meet the cell reselection criterion, and then reselect to the second cell. In this case, a service resource of a cell is fully utilized. For the terminal device that supports uplink enhancement, when distances between the terminal device and a plurality of network devices are the same or close to each other, if the terminal device may not meet the cell reselection criterion in a second to-be-selected cell that does not support uplink enhancement, but meet the cell reselection criterion in a second to-be-selected cell that supports uplink enhancement, the terminal device may reselect to the second cell. In this case, continuity of a communication service between the terminal device and the network device is ensured, reliability of mobility management is enhanced, and the service resource of the cell is fully utilized.

Figure 8:
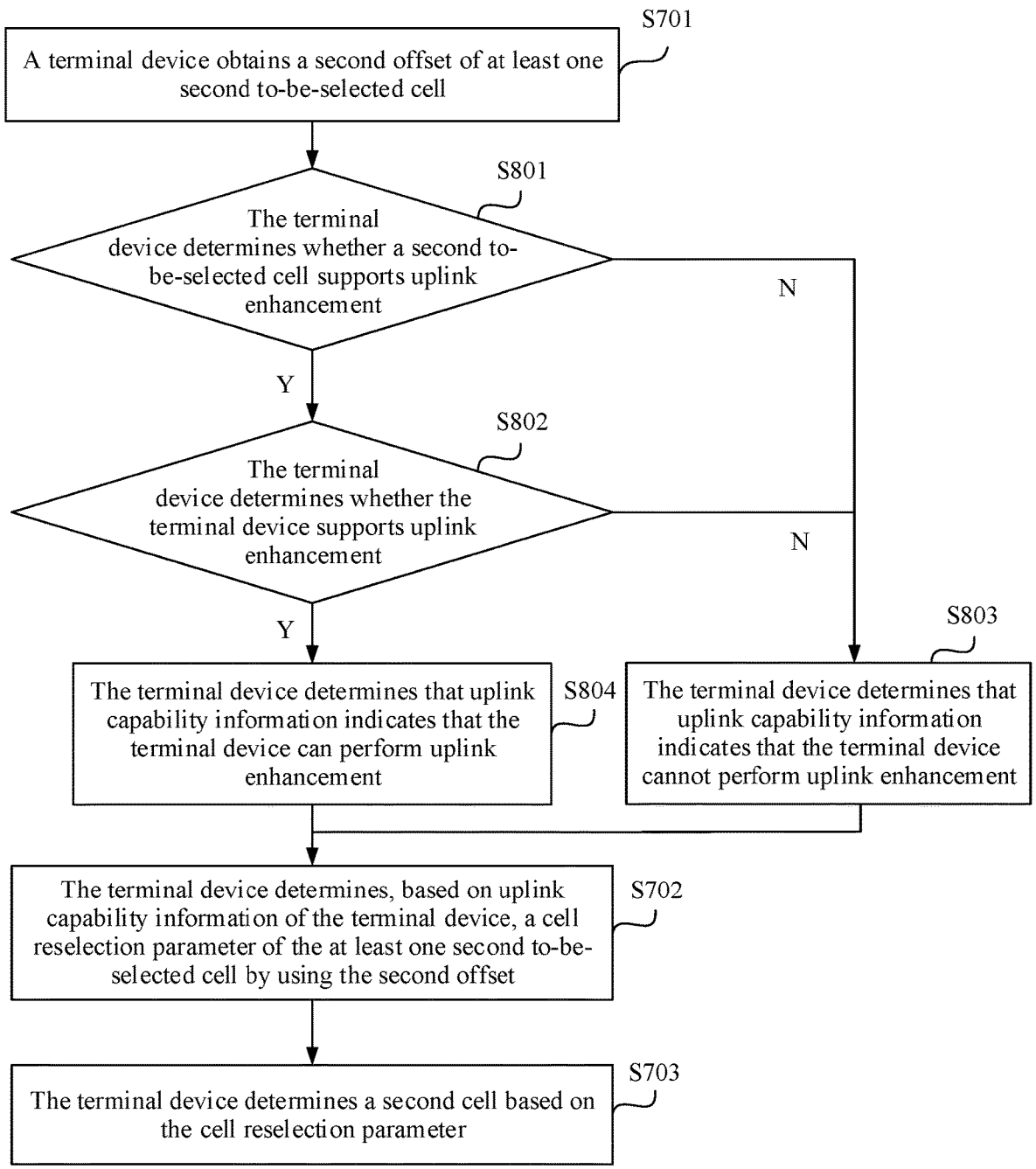
FIG. 8 is a schematic flowchart of another method for determining uplink capability information according to an embodiment of this application.

The following describes a process in which the terminal device determines whether the terminal device can perform uplink enhancement in the neighboring cell. FIG. 8 is a schematic flowchart of a method for determining uplink capability information according to an embodiment of this application. As shown in FIG. 8, the method for determining the uplink capability information includes S801 to S804.

S801: The terminal device determines whether the second to-be-selected cell supports uplink enhancement.

The second to-be-selected cell includes the first cell and the neighboring cell of the first cell.

In this embodiment of this application, the terminal device may separately determine whether the first cell and the neighboring cell support uplink enhancement. For a process in which the terminal device determines whether the first cell supports uplink enhancement, refer to S601. Details are not described herein again. The following describes this embodiment by using an example in which the terminal device determines whether the neighboring cell supports uplink enhancement.

In a possible implementation, the terminal device may obtain indication information of the neighboring cell. The indication information indicates whether the neighboring cell supports uplink enhancement. The terminal device determines, based on the indication information, whether the neighboring cell supports uplink enhancement.

The indication information may be located in the system information. For example, the indication information may be located in the SIB 4, the SIB 5, and/or the SIB 6. For example, the network device may broadcast the system information. Then, the terminal device may receive the system information from the network device, obtain the indication information (the indication information corresponds to a neighboring cell in a neighboring cell list), and determine whether the neighboring cell supports uplink enhancement. For example, the indication information may be a bitmap (bitmap). An $i^{th}$ bit in the bitmap corresponds to an $i^{th}$ cell in at least one to-be-selected cell. When the $i^{th}$ bit is set to 0, it indicates that the $i^{th}$ cell in the neighboring cell list does not support uplink enhancement. When the $i^{th}$ bit is set to 1, it indicates that the $i^{th}$ cell in the neighboring cell list supports uplink enhancement.

In another possible implementation, the indication field may be added to cell information corresponding to each cell (including each of the foregoing neighboring cells) in the neighboring cell list. The indication field indicates whether a corresponding cell supports uplink enhancement.

In another possible implementation, a correspondence between frequency information of a cell and whether the cell supports uplink enhancement may be agreed in a protocol. The terminal device may determine, according to the protocol, whether the neighboring cell supports uplink enhancement. For example, the terminal device may obtain frequency information of the neighboring cell, and determine, according to the protocol, whether the neighboring cell supports uplink enhancement.

In a possible design, if the terminal device determines that the neighboring cell or the first cell supports uplink enhancement, the terminal device performs S802. If the terminal device determines that the neighboring cell does not support uplink enhancement, the terminal device performs S803.

It should be noted that, if it is an optional feature that the neighboring cell (or the first cell) supports uplink enhancement (to be specific, the neighboring cell may support uplink enhancement, or may not support uplink enhancement), the terminal device needs to determine whether the neighboring cell supports uplink enhancement (S801 is performed). If it is a mandatory feature that the neighboring cell supports uplink enhancement (to be specific, the terminal device considers that the neighboring cell supports uplink enhancement), the terminal device does not need to determine whether the neighboring cell supports uplink enhancement (S801 is not performed).

S802: The terminal device determines whether the terminal device supports uplink enhancement.

It should be noted that whether the terminal device supports uplink enhancement is related to the hardware apparatus and the configuration information of the terminal device. The terminal device may obtain information about whether the terminal device supports uplink enhancement.

In a possible design, if the terminal device determines that the terminal device supports uplink enhancement, the terminal device performs S804. If the terminal device determines that the terminal device does not support uplink enhancement, the terminal device performs S803.

It should be noted that, if it is an optional feature that the terminal device supports uplink enhancement (to be specific, the terminal device may support uplink enhancement, or may not support uplink enhancement), the terminal device needs to determine whether the terminal device supports uplink enhancement (S802 is performed). If it is a mandatory feature that the terminal device supports uplink enhancement (to be specific, the terminal device considers that the terminal device supports uplink enhancement), the terminal device does not need to determine whether the terminal device supports uplink enhancement (S802 is not performed).

In other words, if it is an optional feature that the neighboring cell (or the first cell) supports uplink enhancement, and it is an optional feature that the terminal device supports uplink enhancement, the terminal device performs S801 and S802. If it is a mandatory feature that the neighboring cell (or the first cell) supports uplink enhancement, and it is an optional feature that the terminal device supports uplink enhancement, the terminal device does not perform S801, but performs only S802. If it is an optional feature that the neighboring cell (or the first cell) supports uplink enhancement, and it is a mandatory feature that the terminal device supports uplink enhancement, the terminal device performs only S801, but does not perform S802.

It should be noted that a sequence of performing S801 and S802 is not limited in this embodiment of this application. In other words, the terminal device may first perform S801, and then perform S802. Alternatively, the terminal device may first perform S802, and then perform S801. Alternatively, the terminal device may simultaneously perform S801 and S802.

S803: The terminal device determines that the uplink capability information indicates that the terminal device cannot perform uplink enhancement.

S804: The terminal device determines that the uplink capability information indicates that the terminal device can perform uplink enhancement.

It may be understood that, by performing S801 to S804, the terminal device can determine whether the terminal device can perform uplink enhancement. In this way, the terminal device can conveniently determine, based on the uplink capability information, the cell reselection parameter by using a proper second offset, to further determine a suitable cell.

Figure 9:
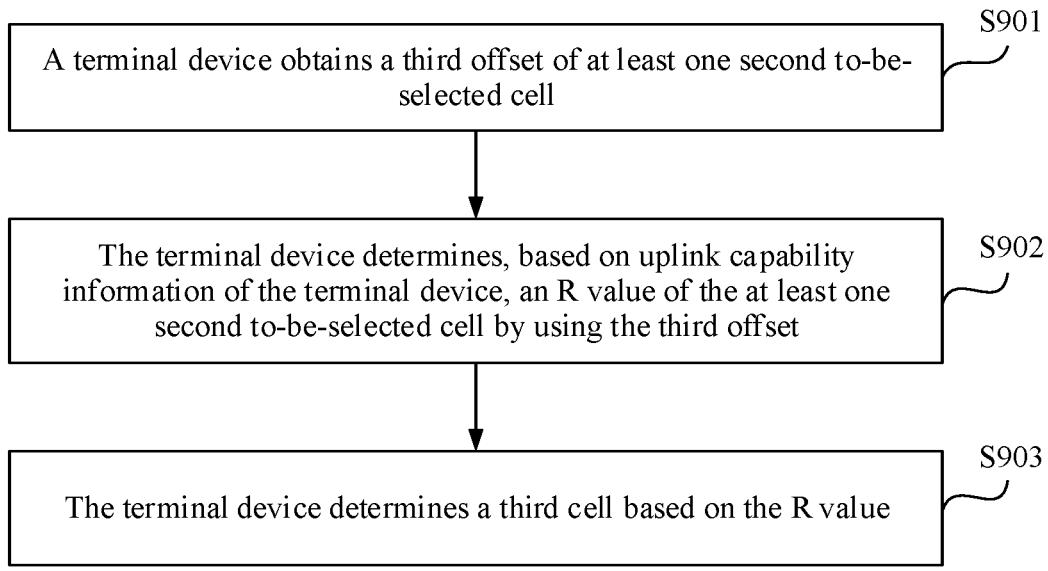
FIG. 9 is a schematic flowchart of another cell selection method according to an embodiment of this application.

The following describes same-priority reselection. For example, FIG. 9 is a schematic flowchart of a cell selection method according to an embodiment of this application. The cell selection method may be applied to communication between the terminal device and the network device shown in FIG. 4.

As shown in FIG. 9, the cell selection method includes the following steps.

S901: The terminal device obtains a third offset of at least one second to-be-selected cell.

In this embodiment of this application, the second to-be-selected cell includes the first cell and a neighboring cell of the first cell.

In some embodiments, before obtaining the third offset of the at least one second to-be-selected cell, the terminal device may determine, as the second to-be-selected cell, a cell that meets Condition 2, Condition 3, or Condition 4 and that is in a plurality of to-be-selected cells. In other words, a cell that meets Condition 2, Condition 3, or Condition 4 and that is in the first cell and the neighboring cell of the first cell is the second to-be-selected cell.

The third offset is used to determine an R value of the at least one second to-be-selected cell.

It should be noted that the third offset may include one or more offset parameters. The third offset may represent a power value, a level value, a quality value, or the like. This is not limited in this embodiment of this application. In addition, the offset parameter included in the third offset may be a positive number, or may be 0, or may be a negative number. For example, the third offset includes 1 decibel relative to one milliwatt (decibel relative to one milliwatt, dBm). For another example, the third offset includes 0 dBm and −3 dBm. For another example, the third offset includes 3 dBm and −5 dBm.

In a possible implementation, the network device may broadcast adjustment information of the first cell and the neighboring cell. The adjustment information includes the third offset. Then, the terminal device may receive the adjustment information from the network device, and obtain a third offset of each cell.

The adjustment information may be located in the system information. For example, the adjustment information may be located in a SIB 4, a SIB 5, and/or a SIB 6.

S902: The terminal device determines, based on the uplink capability information of the terminal device, the R value of the at least one second to-be-selected cell by using the third offset.

In a possible implementation, when the terminal device determines whether the terminal device can perform uplink enhancement, the terminal device determines an R value of the first cell by using a third offset of the first cell, and determines an R value of the neighboring cell by using a third offset of the neighboring cell.

$R_s$ may satisfy the following formula:

$$R_s Q_{meas,s} + Q_{hyst} - Q_{offsettemp} + P_s \qquad \text{Formula 8}$$

$R_s$ represents the R value of the first cell, $Q_{meas,s}$ represents the RSRP measurement quantity used for cell reselection, $Q_{hyst}$ represents a ranking criterion hysteresis factor, $Q_{offsettemp}$ represents the offset, and $P_s$ represents a third offset of the serving cell.

$R_n$ may satisfy the following formula:

$$R_n = Q_{meas,s} + Q_{offset} - Q_{offsettemp} + P_n \qquad \text{Formula 9}$$

$R_n$ represents the R value of the neighboring cell, $Q_{meas,s}$ represents the RSRP measurement quantity used for cell reselection, $Q_{offset}$ represents the ranking criterion hysteresis factor, $Q_{offsettemp}$ represents the offset, and $P_n$ represents a third offset of the neighboring cell.

It should be noted that, for the process in which the terminal device determines whether the terminal device can perform uplink enhancement, refer to S801 to S804. Details are not described herein again.

In this embodiment of this application, the third offset includes a fifth offset parameter and a sixth offset parameter. If the uplink capability information indicates that the terminal device can perform uplink enhancement, the terminal device determines $R_s$ and $R_n$ by using the fifth offset parameter. If the uplink capability information indicates that the terminal device cannot perform uplink enhancement, the terminal device determines $R_s$ and $R_n$ by using the sixth offset parameter. The fifth offset parameter is greater than the sixth offset parameter.

It should be noted that, that the terminal device can perform uplink enhancement includes: The terminal device supports uplink enhancement, and the first cell supports uplink enhancement. That the terminal device cannot perform uplink enhancement includes: The terminal device does not support uplink enhancement, or the first cell does not support uplink enhancement.

In a possible design, if the uplink capability information indicates that the terminal device can perform uplink enhancement, the fifth offset parameter is equal to 0. The fifth offset parameter is equal to 0. In other words, Formula 8 is the same as Formula 3, and/or Formula 9 is the same as Formula 4. In other words, $R_s$ and/or $R_n$ is not changed. If the uplink capability information indicates that the terminal device cannot perform uplink enhancement, the sixth offset parameter is less than 0.

In another possible design, if the uplink capability information indicates that the terminal device can perform uplink enhancement, the fifth offset parameter is greater than 0. If the uplink capability information indicates that the terminal device cannot perform uplink enhancement, the sixth offset parameter is less than or equal to 0.

It should be noted that a value of the third offset is further related to a value of the uplink transmit power of the terminal device. In other words, the terminal device may determine, based on the uplink transmit power of the terminal device (determined based on an uplink enhancement degree and a capability reduction degree), $R_s$ and $R_n$ by using the third-type offset.

It should be noted that, for specific descriptions of the fifth offset parameter, refer to descriptions of the first offset parameter in S502. For specific descriptions of the sixth offset parameter, refer to descriptions of the second offset parameter in S502. Details are not described herein again.

S903: The terminal device determines a third cell based on the R value.

The third cell is one of the at least one second to-be-selected cell, and the third cell meets Condition 2, Condition 3, or Condition 4.

In a possible implementation, the terminal device determines the third cell based on $R_s$ in Formula 8 and $R_n$ in Formula 9.

According to the foregoing technical solution, when determining the R value by using the third offset, the terminal device combines the uplink capability information of the terminal device. The uplink capability information of the terminal device may indicate whether the terminal device can perform uplink enhancement. In this way, in this solution, when the terminal device supports uplink enhancement, for the second to-be-selected cell that supports uplink enhancement and the second to-be-selected cell that does not support uplink enhancement, the different R value determining methods are used. In addition, it should be understood that the terminal device may sort an R value of a cell on which the terminal device currently camps and an R value of a neighboring cell. Therefore, in this solution, when the two types of second to-be-selected cells are sorted, different R value determining methods are used, to ensure normal communication between the terminal device and a selected cell.

In addition, in this solution, if the terminal device that cannot perform uplink enhancement needs to access a cell, the terminal device needs to be closer to the network device, to meet a cell reselection criterion. In this way, even if the terminal device cannot perform uplink enhancement, because the terminal device is close to the network device and the signal is good, normal communication between the terminal device and the network device can still be ensured. For the terminal device that can perform uplink enhancement, when distances between the terminal device and a plurality of network devices are the same or close, according to a criterion R, a cell that supports uplink enhancement ranks higher than a cell that does not support uplink enhancement. That is, the terminal device is more prone to camping on the cell that supports uplink enhancement. In this way, reliability of mobility management is enhanced, and a service resource of a cell is fully utilized.

It should be noted that, in the foregoing embodiments, the second to-be-selected cell includes the first cell and the neighboring cell of the first cell. The neighboring cell of the first cell includes an intra-frequency neighboring cell of the first cell, a same-priority neighboring cell, a high-priority neighboring cell, and/or a low-priority neighboring cell. When the neighboring cell of the first cell includes the intra-frequency neighboring cell, the same-priority neighboring cell, the high-priority neighboring cell, and/or the low-priority neighboring cell, the terminal device may perform both S701 to S703, and perform S901 to S903.

The foregoing describes in detail the cell selection methods provided in embodiments of this application with reference to FIG. 5 to FIG. 9. The following describes in detail a communication apparatus provided in an embodiment of this application with reference to FIG. 10 to FIG. 11.

Figure 10:
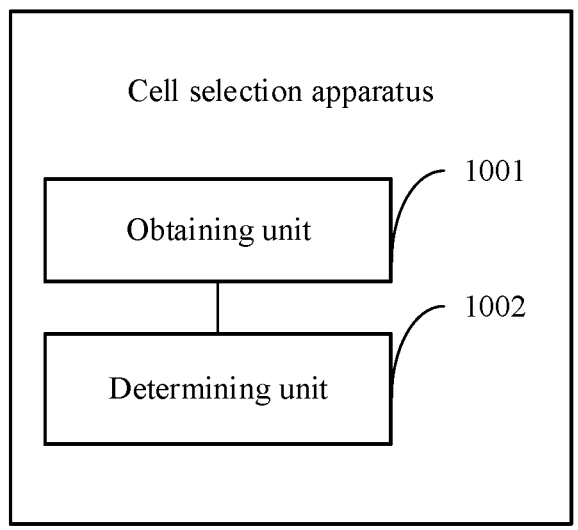
FIG. 10 is a schematic diagram of a structure of a cell selection apparatus according to an embodiment of this application.

For example, FIG. 10 is a schematic diagram of a structure of a cell selection apparatus according to an embodiment of this application. As shown in FIG. 10, the cell selection apparatus 1000 includes an obtaining unit 1001 and a determining unit 1002. For ease of description, FIG. 10 shows only main components of the cell selection apparatus.

In a possible design solution, the cell selection apparatus 1000 is applicable to the communication system shown in FIG. 4, and performs a cell selection function in the cell selection method shown in FIG. 5 to FIG. 9.

The obtaining unit 1001 is configured to obtain a first offset of at least one first to-be-selected cell. The first offset is used to determine a cell selection parameter of the at least one first to-be-selected cell. The cell selection parameter includes a cell selection receive level value Srxlev and/or a cell selection receive quality value Squal. The determining unit 1002 is configured to determine, based on uplink capability information of a terminal device, the cell selection parameter of the at least one first to-be-selected cell by using the first offset. The uplink capability information indicates whether the terminal device can perform uplink enhancement. The determining unit 1002 is further configured to determine a first cell based on the cell selection parameter. The first cell is one of the at least one first to-be-selected cell.

Optionally, the first offset includes a first-type offset, and the first-type offset is used to determine Srxlev.

Optionally, the determining unit 1002 is configured to: if the uplink capability information indicates that the terminal device can perform uplink enhancement, determine Srxlev of a first to-be-selected cell by using a first offset parameter in the first-type offset; or if the uplink capability information indicates that the terminal device cannot perform uplink enhancement, determine Srxlev of a first to-be-selected cell by using a second offset parameter in the first-type offset. The first offset parameter is greater than the second offset parameter. That the terminal device can perform uplink enhancement includes: The terminal device supports uplink enhancement, and the first to-be-selected cell supports uplink enhancement. That the terminal device cannot perform uplink enhancement includes: The terminal device does not support uplink enhancement, or the first to-be-selected cell does not support uplink enhancement.

Optionally, the first offset parameter is equal to 0, and the second offset parameter is less than 0. Alternatively, the first offset parameter is greater than 0, and the second offset parameter is less than or equal to 0.

Optionally, the first offset includes a second-type offset, and the second-type offset is used to determine Squal.

Optionally, the determining unit 1002 is configured to: if the uplink capability information indicates that the terminal device can perform uplink enhancement, determine Squal of the first to-be-selected cell by using a third offset parameter in the second-type offset; or if the uplink capability information indicates that the terminal device cannot perform uplink enhancement, determine Squal of the first to-be-selected cell by using a fourth offset parameter in the second-type offset. The third offset parameter is greater than the fourth offset parameter. That the terminal device can perform uplink enhancement further includes: The terminal device supports uplink enhancement, and the first to-be-selected cell supports uplink enhancement. That the terminal device cannot perform uplink enhancement further includes: The terminal device does not support uplink enhancement, or the first to-be-selected cell does not support uplink enhancement.

Optionally, the third offset parameter is equal to 0, and the fourth offset parameter is less than 0. Alternatively, the third offset parameter is greater than 0, and the fourth offset parameter is less than or equal to 0.

Optionally, the obtaining unit 1001 is further configured to obtain indication information of the at least one first to-be-selected cell. The indication information indicates whether a corresponding cell supports uplink enhancement.

Optionally, the obtaining unit 1001 is further configured to obtain a second offset of at least one second to-be-selected cell. The second offset is used to determine a cell reselection parameter of the at least one second to-be-selected cell, and the cell reselection parameter includes Srxlev and/or Squal. The determining unit 1002 is further configured to determine, based on the uplink capability information of the terminal device, the cell reselection parameter of the at least one second to-be-selected cell by using the second offset. The determining unit 1002 is further configured to determine a second cell based on the cell reselection parameter. The second cell is one of the at least one second to-be-selected cell.

Optionally, the obtaining unit 1001 is further configured to obtain a third offset of at least one second to-be-selected cell. The third offset is used to determine an R value of the at least one second to-be-selected cell. The determining unit 1002 is further configured to determine, based on the uplink capability information of the terminal device, the R value of the at least one second to-be-selected cell by using the third offset. The determining unit 1002 is further configured to determine a third cell based on the R value. The third cell is one of the at least one second to-be-selected cell.

Optionally, the determining unit 1002 is further configured to: if the uplink capability information indicates that the terminal device can perform uplink enhancement, determine the R value of the second to-be-selected cell by using a fifth offset parameter in a third offset of the second to-be-selected cell; or if the uplink capability information indicates that the terminal device cannot perform uplink enhancement, determine the R value of the second to-be-selected cell by using a sixth offset parameter in a third offset of the second to-be-selected cell. The fifth offset parameter is greater than the sixth offset parameter. That the terminal device can perform uplink enhancement includes: The terminal device supports uplink enhancement, and the second to-be-selected cell supports uplink enhancement. That the terminal device cannot perform uplink enhancement includes: The terminal device does not support uplink enhancement, or the second to-be-selected cell does not support uplink enhancement.

Optionally, the fifth offset parameter is equal to 0, and the sixth offset parameter is less than 0. Alternatively, the fifth offset parameter is greater than 0, and the sixth offset parameter is less than or equal to 0.

Optionally, the cell selection apparatus 1000 shown in FIG. 10 may further include a storage module (not shown in FIG. 10), and the storage module stores a program or instructions. When the determining unit 1002 executes the program or instructions, the cell selection apparatus 1000 is enabled to perform a cell selection function in the cell selection method shown in FIG. 5.

It should be noted that the cell selection apparatus 1000 may be any terminal device or any network device shown in FIG. 4, or may be a chip (system) or another component or assembly disposed in the terminal device or the network device. This is not limited in this embodiment of this application.

In addition, for technical effect of the cell selection apparatus 1000, refer to technical effect of the cell selection method shown in FIG. 5 to FIG. 9. Details are not described herein again.

Figure 11:
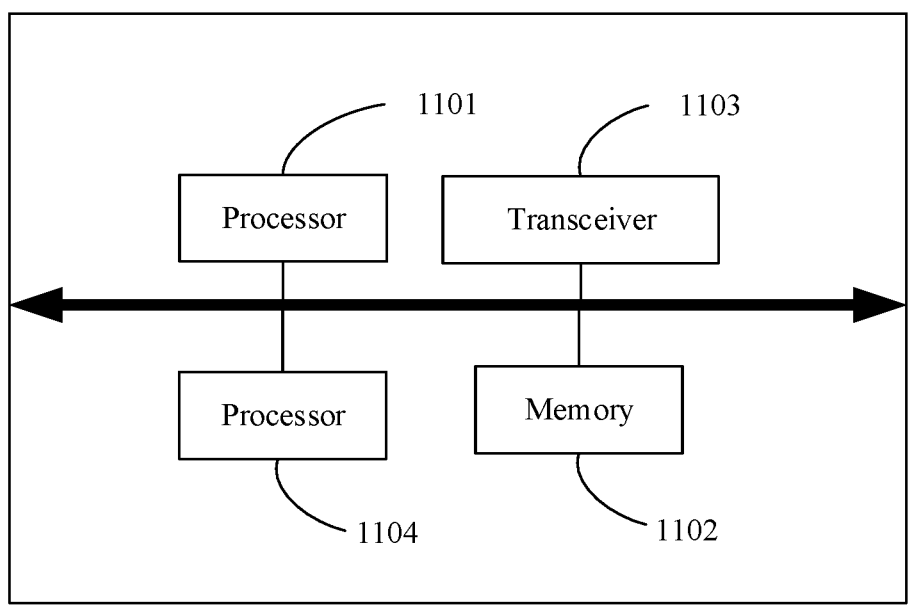
FIG. 11 is a schematic diagram of a structure of another cell selection apparatus according to an embodiment of this application.

For example, FIG. 11 is a schematic diagram of a structure of a cell selection apparatus according to an embodiment of this application. The cell selection apparatus may be a terminal device or a network device, or may be a chip (system) or another component or assembly that can be disposed in the terminal device or the network device. As shown in FIG. 11, the cell selection apparatus 1100 may include a processor 1101. Optionally, the cell selection apparatus 1100 may further include a memory 1102 and/or a transceiver 1103. The processor 1101 is coupled to the memory 1102 and the transceiver 1103, for example, through a communication bus.

The following describes components of the cell selection apparatus 1100 in detail with reference to FIG. 11.

The processor 1101 is a control center of the network device, and may be one processor or may be a general term of a plurality of processing elements. For example, the processor 1101 is one or more central processing units (central processing unit, CPU), or may be an application-specific integrated circuit (application-specific integrated circuit, ASIC), or may be one or more integrated circuits configured to implement embodiments of this application, for example, one or more microprocessors (digital signal processor, DSP) or one or more field programmable gate arrays (field programmable gate array, FPGA).

Optionally, the processor 1101 may perform various functions of the network device by running or executing a software program stored in the memory 1102 and invoking data stored in the memory 1102.

During specific implementation, in an embodiment, the network device may alternatively include a plurality of processors, for example, the processor 1101 and the processor 1104 shown in FIG. 11. Each of the processors may be a single-core processor (single-CPU) or a multi-core processor (multi-CPU). The processor herein may be one or more communication devices, circuits, and/or processing cores configured to process data (for example, computer program instructions).

The memory 1102 is configured to store a software program for performing the solutions of this application, and the processor 1101 controls execution of the software program. For a specific implementation, refer to the foregoing method embodiments. Details are not described herein again.

Optionally, the memory 1102 may be a read-only memory (read-only memory, ROM) or another type of static storage communication device that can store static information and instructions, or a random access memory (random access memory, RAM) or another type of dynamic storage communication device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, and the like), a magnetic disk storage medium or another magnetic storage communication device, or any other medium that can be used to carry or store expected program code in a form of an instruction or a data structure and that can be accessed by a computer. However, this is not limited thereto. The memory 1102 may be integrated with the processor 1101, or may exist independently, and is coupled to the processor 1101 through an input/output port (not shown in FIG. 11) of the network device. This is not specifically limited in this embodiment of this application.

The transceiver 1103 is configured to communicate with another network device. For example, the network device is a terminal device, and the transceiver 1103 may be configured to communicate with the network device or communicate with another terminal device. For another example, the network device is a network device, and the transceiver 1103 may be configured to communicate with a terminal device or communicate with another network device.

Optionally, the transceiver 1103 may include a receiver and a transmitter (not separately shown in FIG. 11). The receiver is configured to implement a receiving function, and the transmitter is configured to implement a sending function.

Optionally, the transceiver 1103 may be integrated with the processor 1101, or may exist independently, and is coupled to the processor 1101 through an input/output port (not shown in FIG. 11) of the network device. This is not specifically limited in this embodiment of this application.

It should be understood that, the processor in embodiments of this application may be a central processing unit (central processing unit, CPU). The processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not restrictive description, many forms of random access memories (random access memory, RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one item (piece) of the following" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cell selection method, comprising:
    determining, based on uplink capability, whether a reduced capability user equipment (REDCAP UE) can perform uplink enhancement;
    obtaining, based on the determination as to whether the REDCAP UE can perform the uplink enhancement, a first offset of at least one first to-be-selected cell, wherein the first offset is used for determining a cell selection parameter including at least one of a cell selection receive level value Srxlev or a cell selection receive quality value Squal, wherein the first offset is at least one of a reference signal receive level offset N of the cell selection receive level value Srxlev or a reference signal receive quality offset M of the cell selection receive quality value Squal;
    determining, based on the first offset, the cell selection parameter of the at least one first to-be-selected cell,
    wherein the cell selection receive level value Srxlev is determined by a first formula:
    $Srxlev = Q_{rxlevmeas} - (Q_{rxlevmin} + Q_{rxlevminoffset}) - P_{compensation} - Q_{offsettemp} + N$, wherein Srxlev represents the cell selection receive level value, $Q_{rxlevmeas}$ represents a reference signal received power, $Q_{rxlevmin}$ represents a minimum signal received power, $Q_{rxlevminoffset}$ represents an offset of $Q_{rxlevmin}$, $P_{compensation}$ represents a power compensation value, $Q_{offsettemp}$ represents an offset, N represents the reference signal receive level offset of the cell selection receive level value Srxlev;
    wherein the cell selection receive quality value Squal is determined by a second formula:
    $Squal = Q_{qualmeas} - (Q_{qualmin} + Q_{qualminoffset}) - Q_{offsettemp} + M$, wherein Squal represents the cell selection receive quality value, $Q_{qualmeas}$ represents reference signal received quality, $Q_{qualmin}$ represents minimum reference signal received quality, $Q_{qualminoffset}$ represents an offset of $Q_{qualmin}$, $Q_{offsettemp}$ represents an offset, and M represents the reference signal receive quality offset of the cell selection receive quality value Squal; and
    wherein when the REDCAP UE can perform the uplink enhancement, each of M and N is set to 0 and when the REDCAP UE can not perform the uplink enhancement, each of M and N is set to a value less than 0; and
    determining, based on the cell selection parameter, a first cell from the at least one first to-be-selected cell.

2. The method of claim 1, the method further comprising:
    obtaining indication information of the at least one first to-be-selected cell, the indication information indicating whether the at least one first to-be-selected cell supports the uplink enhancement.

3. The method of claim 1, after the determining the first cell based on the cell selection parameter, the method further comprising:
    obtaining a second offset of the first cell and a neighboring cell of the first cell, wherein the second offset is at least one of a reference signal receive level offset or a reference signal receive quality offset;
    determining, based on the second offset and uplink capability as to whether the terminal device can perform uplink enhancement with the first cell and the neighboring cell, a second cell selection parameter including at least one of a cell selection receive level value Srxlev or a cell selection receive quality value Squal; and
    determining, based on the second cell selection parameter value and a cell reselection priority, a second cell from the first cell and the neighboring cell, the cell reselection priority including a high-priority reselection, same-priority reselection or a low-priority reselection.

4. The method of claim 1, after the determining the first cell based on the cell selection parameter, the method further comprising:
    obtaining a third offset of at least one second to-be-selected cell, wherein the third offset is used to determine an R value of the at least one second to-be-selected cell, with the R value representing a cell rating criterion related to a reference signal receive power (RSRP) measurement;
    determining, based on the third offset and uplink capability as to whether the terminal device can perform uplink enhancement with the at least one second to-be-selected cell, the R value of the at least one second to-be-selected cell; and
    determining, based on the R value, a third cell from the at least one second to-be-selected cell.

5. The method of claim 4, wherein the determining the R value of the at least one second to-be-selected cell comprises:
    determining the R value of the at least one second to-be-selected cell by performing the following step:
    if the terminal device can perform uplink enhancement with the at least one second to-be-selected cell, determining the R value of the at least one second to-be-selected cell by using a fifth offset parameter in a third offset of the at least one second to-be-selected cell; or
    if the terminal device cannot perform uplink enhancement with the at least one second to-be-selected cell, determining the R value of the second to-be-selected cell by using a sixth offset parameter in the third offset of the second to-be-selected cell,
    wherein the fifth offset parameter is greater than the sixth offset parameter.

6. The method of claim 5,
    wherein the fifth offset parameter is equal to 0, and the sixth offset parameter is less than 0; or
    wherein the fifth offset parameter is greater than 0, and the sixth offset parameter is less than or equal to 0.

7. The method of claim 1, wherein the uplink enhancement comprises at least one of an uplink transmission bundling or an uplink transmission repetition.

8. A cell selection apparatus, comprising:
    a processor, and
    a non-transitory memory coupled to the processor and configured to store a computer program, the computer program comprising computer instructions that, when executed by the processor, cause the cell selection apparatus to perform:
    determining, based on uplink capability, whether a reduced capability user equipment (REDCAP UE) can perform uplink enhancement;
    obtaining, based on the determination as to whether the REDCAP UE can perform the uplink enhancement, a first offset of at least one first to-be-selected cell, wherein the first offset is used for determining a cell selection parameter including at least one of a cell selection receive level value Srxlev or a cell selection receive quality value Squal, wherein the first offset is at least one of a reference signal receive level offset N of the cell selection receive level value Srxlev or a reference signal receive quality offset M of the cell selection receive quality value Squal;

determining, based on the first offset, the cell selection parameter of the at least one first to-be-selected cell, wherein the cell selection receive level value Srxlev is determined by a first formula:

$Srxlev = Q_{rxlevmeas} - (Q_{rxlevmin} + Q_{rxlevminoffset}) - P_{compensation} - Q_{offsettemp} + N$, wherein Srxlev represents the cell selection receive level value, $Q_{rxlevmeas}$ represents a reference signal received power, $Q_{rxlevmin}$ represents a minimum signal received power, $Q_{rxlevminoffset}$ represents an offset of $O_{rxlevmin}$, $P_{compensation}$ represents a power compensation value, $Q_{offsettemp}$ represents an offset, N represents the reference signal receive level offset of the cell selection receive level value Srxlev;

wherein the cell selection receive quality value Squal is determined by a second formula:

$Squal = Q_{qualmeas} - (Q_{qualmin} + Q_{qualminoffset}) - Q_{offsettemp} + M$, wherein Squal represents the cell selection receive quality value, $Q_{qualmeas}$ represents reference signal received quality, $Q_{qualmin}$ represents minimum reference signal received quality, $Q_{qualminoffset}$ represents an offset of $Q_{qualmin}$, $Q_{offsettemp}$ represents an offset, and M represents the reference signal receive quality offset of the cell selection receive quality value Squal; and wherein when the REDCAP UE can perform the uplink enhancement, each of M and N is set to 0 and when the REDCAP UE can not perform the uplink enhancement, each of M and N is set to a value less than 0; and determining, based on the cell selection parameter, a first cell from the at least one first to-be-selected cell.

9. The cell selection apparatus of claim 8, wherein the uplink enhancement comprises at least one of an uplink transmission bundling or an uplink transmission repetition.

10. A system for cell communications, comprising:
a network device; and
a terminal device in communication with the network device and configured to:
determining, based on uplink capability, whether a reduced capability user equipment REDCAP UE) can perform uplink enhancement;
obtaining, based on the determination as to whether the REDCAP UE can perform the uplink enhancement, a first offset of at least one first to-be-selected cell, wherein the first offset is used for determining a cell selection parameter including at least one of a cell selection receive level value Srxlev or a cell selection receive quality value Squal, wherein the first offset is at least one of a reference signal receive level offset N of the cell selection receive level value Srxlev or a reference signal receive quality offset M of the cell selection receive quality value Squal;
determining, based on the first offset, the cell selection parameter of the at least one first to-be-selected cell,
wherein the cell selection receive level value Srxlev is determined by a first formula:

$Srxlev = Q_{rxlevmeas} - (Q_{rxlevmin} + Q_{rxlevminoffset}) - P_{compensation} - Q_{offsettemp} + N$, wherein Srxlev represents the cell selection receive level value, $Q_{rxlevmeas}$ represents a reference signal received power, $Q_{rxlevmin}$ represents a minimum signal received power, $Q_{rxlevminoffset}$ represents an offset of $O_{rxlevmin}$, $P_{compensation}$ represents a power compensation value, $Q_{offsettemp}$ represents an offset, N represents the reference signal receive level offset of the cell selection receive level value Srxlev; and wherein the cell selection receive quality value Squal is determined by a second formula:

$Squal = Q_{qualmeas} - (Q_{qualmin} + Q_{qualminoffset}) - Q_{offsettemp} + M$, wherein Squal represents the cell selection receive quality value, $Q_{qualmeas}$ represents reference signal received quality, $Q_{qualmin}$ represents minimum reference signal received quality, $Q_{qualminoffset}$ represents an offset of $Q_{qualmin}$, $Q_{offsettemp}$ represents an offset, and M represents the reference signal receive quality offset of the cell selection receive quality value Squal; and wherein when the REDCAP UE can perform the uplink enhancement, each of M and N is set to 0 and when the REDCAP UE can not perform the uplink enhancement, each of M and N is set to a value less than 0; and determining, based on the cell selection parameter, a first cell from the at least one first to-be-selected cell.

11. The system of claim 10, wherein the uplink enhancement comprises at least one of an uplink transmission bundling or an uplink transmission repetition.

12. The method of claim 2, wherein the indication information comprises a bitmap with a plurality of bits for a list of cells, each bit in the bitmap indicating whether a cell corresponding to one of the list of cells supports the uplink enhancement.

13. The cell selection apparatus of claim 8, wherein the computer program further comprises computer instructions that, when executed by the processor, cause the cell selection apparatus to perform:
obtaining indication information of the at least one first to-be-selected cell, wherein the indication information comprises a bitmap with a plurality of bits for a list of cells, each bit in the bitmap indicating whether a cell corresponding to one of the list of cells supports uplink enhancement.

14. The system of claim 10, wherein the terminal device is further configured to:
obtain indication information of the at least one first to-be-selected cell, wherein the indication information comprises a bitmap with a plurality of bits for a list of cells, each bit in the bitmap indicating whether a cell corresponding to one of the list of cells supports uplink enhancement.

* * * * *